United States Patent [19]
Ozaki et al.

[11] Patent Number: 5,585,855
[45] Date of Patent: Dec. 17, 1996

[54] DIGITAL VIDEO SIGNAL CODING CIRCUIT, DIGITAL SIGNAL DECODING CIRCUIT

[75] Inventors: Hidetoshi Ozaki; Minoru Otani, both of Yokohama; Masaki Mori, Yokosuka, all of Japan

[73] Assignee: Victor Company of Japan, Ltd., Yokohama, Japan

[21] Appl. No.: 264,674

[22] Filed: Jun. 23, 1994

[30]    Foreign Application Priority Data

Jun. 30, 1993    [JP]    Japan ................................. 5-186895

[51] Int. Cl.$^6$ .............................. H04N 7/12; G11B 5/02; G11B 5/00

[52] U.S. Cl. ....................................... 348/408; 360/27/32

[58] Field of Search .............................. 360/35.1, 40, 48, 360/53, 27, 32, 61, 22; 358/358; 341/50; 348/394, 416, 420, 408

[56]    References Cited

U.S. PATENT DOCUMENTS

| | | | |
|---|---|---|---|
| 3,581,207 | 5/1971 | Chang | 324/77 X |
| 4,974,086 | 11/1990 | Ehrhardt | 358/198 |
| 5,168,356 | 12/1992 | Acampora et al. | 358/133 |
| 5,315,326 | 5/1994 | Sugiyama | 348/415 |
| 5,381,275 | 1/1995 | Nitta et al. | 360/48 |
| 5,424,778 | 6/1995 | Sugiyama et al. | 348/403 |

FOREIGN PATENT DOCUMENTS

| | | |
|---|---|---|
| 0487282 | 5/1992 | European Pat. Off. . |
| 0538834 | 4/1993 | European Pat. Off. . |

OTHER PUBLICATIONS

Signal Processing of HDTV, III, Sep. 1991, Turin, It, pp. 547–554, XP000379993, Stammnitz et al —Hardware Implementation of a Codec for Digital HDTV Recording'.

Signal Processing of HDTV, III, Sep. 1991, Turin, It, pp. 523–530, XP000379990, Chiang et al —Compatible Coding of Digital Interlaced HDTV Using Prediction of the Even Field from the Odd Field'.

*Primary Examiner*—Andrew L. Sniezek
*Assistant Examiner*—Regina Y. Neal
*Attorney, Agent, or Firm*—Lowe, Price, Leblanc & Becker

[57]    ABSTRACT

A digital video signal coding circuit has a first DCT circuit for DCT converting a digital video signal with respect to frame and second DCT circuit for DCT converting the digital video signal with respect to fields which is used to reduce high frequency component of image. These outputs are selected according to high frequency components. The selected signal is separated to two signals respectively coded with data compression through VLC circuits which are provided to speed up the processing speed with non-industrial use ICs. A helical scan video tape recorder records the digital video signal such that at a lower portion (width direction) of slant track on a video tape, video data of an upper screen portion of the first field is recorded, at an upper portion of the track, video data of the upper screen portion of the second field is recorded, at a lower portion of the next slant track, video data of a lower screen portion of the first field is recorded, and at an upper portion, video data of the lower screen portion of the second field is recorded. This provides favorable image on a searching mode.

2 Claims, 17 Drawing Sheets

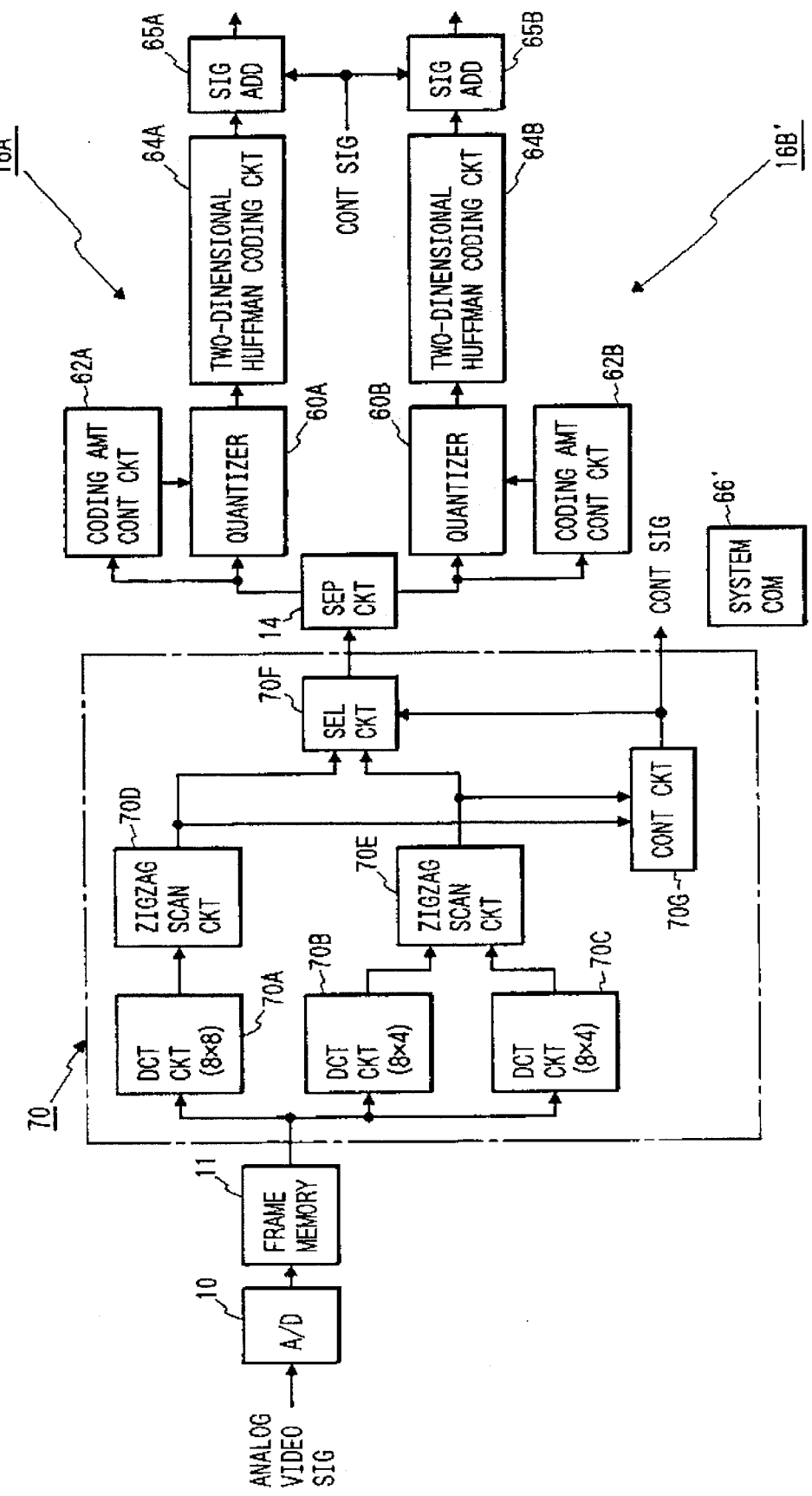

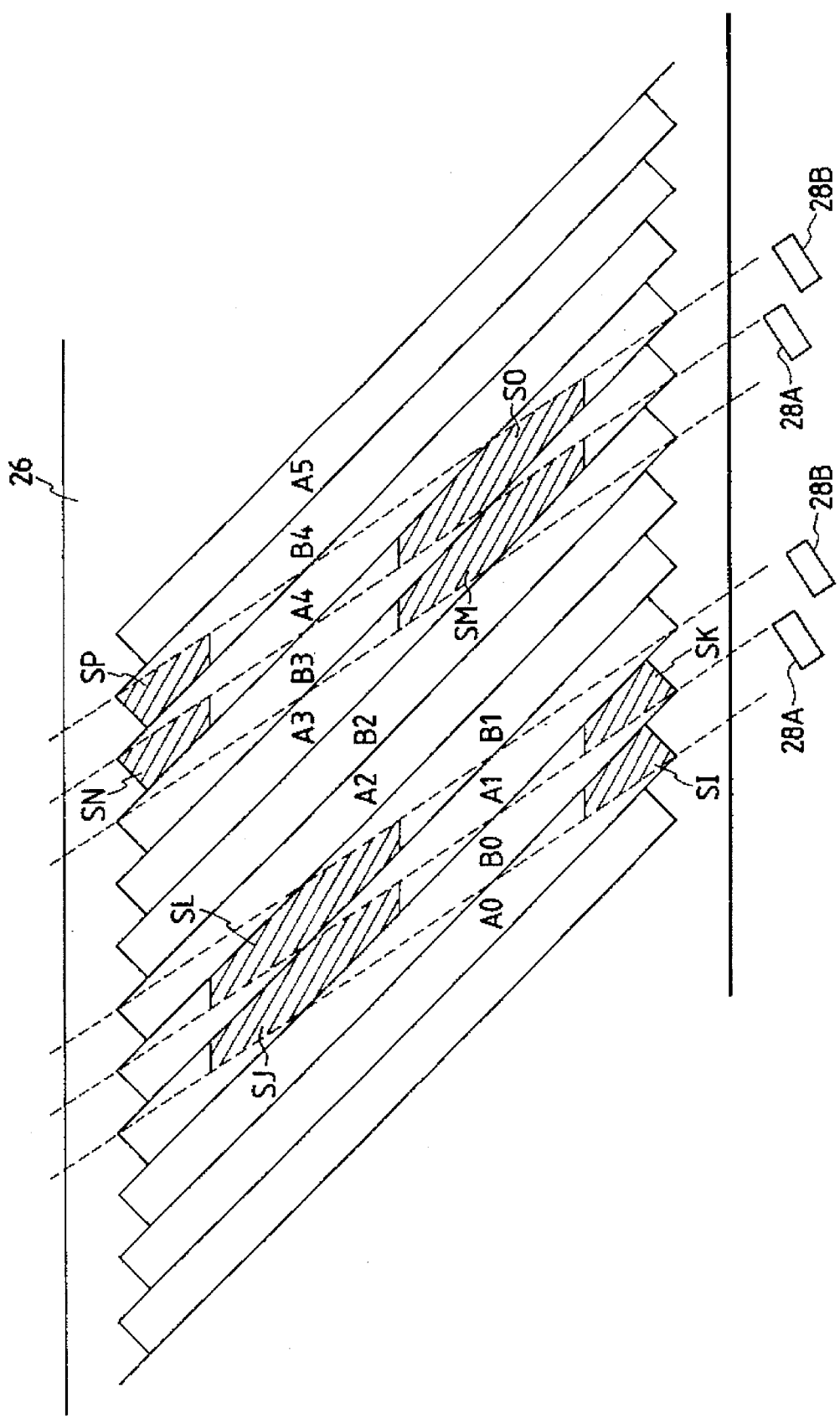

DIGITAL VIDEO SIGNAL CODING CIRCUIT, DIGITAL SIGNAL DECODING CIRCUIT

BACKGROUND OF THE INVENTION

1. Field of the Invention

This invention relates to a digital video signal coding circuit for coding a digital video signal with data compression, a decoding circuit for decoding a digital video signal coded by the digital video signal coding circuit, and a helical scan video tape recorder including these circuits.

2. Description of the Prior Art

A digital coding circuit for coding a digital video signal with data compression used in a digital VTR is known. This digital coding circuit codes the digital video signal through a quadrature conversion orthogonal transforming means circuit, a variable length coding circuit, an error correction coding circuit, and a record coding circuit in order to record the digital video signal on a recording medium, such as a magnetic tape. A digital decoding circuit decoding a reproduced digital video signal reproduced from the recording medium, on which the digital video signal has been recorded as mentioned above, through a data detection circuit, an error correction circuit, a variable length decoding circuit, and a quadrature inverse conversion circuit.

Generally, in the case of non-industrial use digital VTRs or home use digital VTRs, because the number of manufactured apparatus is larger than that of the industrial use digital VTRs, the development and manufacturing costs of ICs used in the non-industrial use digital VTR is low. Contrary, because the number of manufactured high picture quality digital VTRs is extremely small generally, the development and manufacturing costs of ICs per set tends to be high.

Therefore, there is such an idea that a cost of a high picture quality digital VTR can be reduced by using common signal processing ICs between non-industrial use digital VTRs and high picture quality digital VTRs.

In the non-industrial use digital VTR or home use digital VTR, a cassette size (tape length) should be determined in consideration of not only picture quality but a recording duration and ease in handling of the cassette. Generally, there is a tendency that a small cassette size is preferred, which is provided by making a coding compression rate large to the extent of ¼ to 1/tens. On the other hand, in the high picture quality digital VTR, because the picture quality is important, a relatively small coding compression rate such as ½ to ¼ is selected.

Here, "small coding compression" means that an amount of data recorded/reproduced on/from a video tape is large. In other words, an amount of data per unit interval which a signal processing circuit of a high picture quality digital VTR should process is large. Accordingly, the signal processing circuit is required to operate at a high speed.

However, generally, the demand for the high speed operation makes a circuit scale large. On the other hand, from a point of view of the manufacturing cost and the reduction of power consumption, the circuit scale of the signal processing circuit in the IC should be made as small as possible.

From the point of view as mentioned above, it is extremely desirable that internal circuits in a signal processing IC for the non-industrial used digital VTR are unchanged and a signal processing circuit for a high quality digital VTR is formed by using a plurality of such ICs or by using such an IC with some external additional circuits. This idea is also applicable to the digital disc recorder or the like.

FIG. 10 is a block diagram of an example of such a prior art digital coding circuit and decoding circuit used in a prior art digital VTR. FIG. 11 is a partial block diagram of the prior art digital coding circuit shown in FIG. 10. In FIGS. 10 and 11, an analog video signal is inputted to an A/D converter 10 for converting the analog video signal into a digital video signal. Then, the digital video signal is supplied a frame memory 11 for temporary store the digital video signal for DCT (Discrete Cosine Transform) conversion. Then, the digital video signal is supplied to a DCT circuit 50 of a quadrature conversion circuit 12 for effecting a DCT processing, i.e., the DCT conversion, to provide coefficient data. The coefficient data are supplied to a zigzag scanning circuit 52. FIG. 12 is an illustration for showing a prior art zigzag scanning. The zigzag scanning circuit 52 scans the coefficient data and outputs of the coefficient data serially in the order as shown in FIG. 12. The coefficient data after zigzag scanning are supplied to a separating circuit 14 for separating the coefficient data into odd number$^{th}$ data and even number$^{th}$ data trains wherein ordinal numbers are shown in FIG. 12. FIG. 14 is a block diagram of an example of the separating circuit 14. In FIG. 14, the first data D(0) of the DCT coefficient data zigzag-scanned is written into either of FIFO memories 14A and 14B, for example, the FIFO memory 14A. The next second data D(1) is written into the FIFO memory 14B. Similarly, the following data D(2), D(3), D(4), . . . are written in to FIFO memories 14A and 14B alternately. That is, even number$^{th}$ data is stored in the FIFO memory 14A as an even number$^{th}$ data train and odd number$^{th}$ data is stored in the FIFO memories 14B as an odd number$^{th}$ data train.

Then, each data train separated by the FIFO memories 14A and 14B is supplied to each of data addition switches 14D and 14E. In these switches, data "0" is added to thirty-third to sixty-fourth data of each data train including thirty-two data. Therefore, if the above-mentioned processing is effected to the first to sixty-fourth data which are assumed to be other than "zero", data other than "0" exist at only from first to thirty-second data and two sets of data trains, each having possibility of the number of data other than "0" is a half of the number before the processing, are obtained. A control circuit 14C effects the writing and the reading of data in each of memories 14A and 14B and the switching control of switches 14D and 14E. The control circuit 14C may be formed commonly to the system controller 66 (refer to FIG. 11).

The even and odd number$^{th}$ coefficient data trains produced as mentioned are supplied to variable length coding circuits 16A and 16B respectively as shown in FIGS. 10 and 11. Then, quantizers 60A and 60B effect the quantization processing for approximating the coefficient data trains with discrete levels respectively. Coarseness of the quantizing levels is-controlled by the coding amount control circuits 62A and 62B, that is, these circuits provide so-called non-linear quantization.

Then, the quantized coefficient data trains are supplied to the two-dimensional Huffman coding circuits 64A and 64B respectively. Then, the variable length coding processings are effected wherein a short code is assigned to a level where a degree of occurrence frequency is high. Concretely, the two-dimensional Huffman coding for two-dimensionally assigning of codes through combining a zero-run-length and a value of coefficient data after the quantizing is effected. A system controller 66 controls respective circuits.

Then, output signals of the two-dimensional Huffman coding circuits 64A and 64B are further subjected to coding for error correction by the error correction coding circuits 18A and 18B and coding for recording by record coding circuits 20A and 20B. Then, data after final coding are recorded by recording heads 24A and 24B on a video tape 26 after amplification by amplifiers 22A and 22B.

Then, the reproducing side will be described. Data reproduced by reproducing heads 28A and 28B from the video tape 26 is amplified by amplifiers 30A and 30B and then, supplied to data detection circuits 32A and 32B for detecting video data other than synchronizing signals and control signals. Then, error detection and correction by error correction circuits 34A and 34B detect errors and correct the errors and then, variable length decoding circuits 36A and 36B decode the corrected data. The decoded data are mixed by a mixing circuit 38, that is, a reverse processing to the separation circuit 14 is effected.

Data trains after mixing are decoded by a quadrature inverse conversion circuit 40, i.e., a quadrature inverse conversion which is reverse to the DCT conversion is effected. Further, the output of the frame memory 41 is converted into an analog video signal by a D/A converter 42. As mentioned, the decoding of data from the reproduced video data is effected.

As mentioned, the coefficient data after the quadrature conversion are subjected to processings such as coding with the coefficient data separated into two, each of two being subjected to further processings. Therefore, a high picture quality digital VTR is provided, which is capable of processing the digital video signal at about twice as much amount of information as the conventional structure though signal processing ICs for the non-industrial use VTR are used.

Here, the number of order of the two-divisional DCT effected in the quadrature conversion circuit 12 is generally 8×8 pixels. This is mainly used in the case of the processing of video data within a frame. If an ordinary clock frequency for the video processing is used, it is convenient to deal 8×8 pixels as a unit because the quadrature conversion is effected at an approximately square region within the frame.

However, there are cases that the number of order of DCT should be changed. FIG. 13 shows illustrations of prior art for showing partial images on a screen or extracted images. For example, it is assumed that there is a vertical bar ST on a reproduced image as shown by a frame image 13a and a camera taking this image is panned in a lateral direction (in a direction denoted by an arrow FA). In this case, a portion (8×8 pixels) is extracted from the frame image 13a and the result is shown by the illustration 13b for example. This is separated into respectively images of even and odd fields as shown by illustrations 13c and 13d.

In such a situation, it is known that the conversion coefficients concentrate to a lower frequency component when images of the odd and even fields are separated and the two-dimensional DCT is effected with respect to 8×4 pixels than the case would be obtained by the two dimensional DCT effected with the 8×8 pixels as a unit within a frame as shown by the illustration 13b. Then, in the case of such image, two-dimensional DCTs of 8×8 and 8×4 are switched adaptively. If such switching processing is effected, an amount of lost of information decreases, so that a high picture quality is provided.

However, if such a switching of the number of order is applied to the prior art mentioned above merely, there is a case where information of the first and second fields is mixed in the data train after separation of data after zigzag scanning. This is not good for the searching because heads traverse tracks slantwise, so that a reproduced signal is obtained partially from the relation of azimuth. Thus, there is a case where only either of two data trains after separation is obtained.

In such a case, if an image is reproduced from only either data train, the block distortion is prominent in the reproduce image because the DCT inverse conversion is effected with a half of data. Here, if data of the other field is mixed with in the data train after separation, the number of data used for the DCT inverse conversion is less than a half, so that the picture quality further decreases. A helical scan digital video tape recorder including these coding and decoding circuits. In such a helical scan digital video tape recorder, there is problem in that in the searching mode, the picture quality reproduced in the searching mode is not sufficient.

SUMMARY OF THE INVENTION

The present invention has been developed in order to remove the above-described drawbacks inherent to the conventional digital video signal coding circuit, digital signal decoding circuit, and helical scan video tape recorder including these circuits.

According to this invention, there is provided coding circuit and decoding circuit that the separation of the quadrature conversion coefficient data is suitably effected without information of each field mixed to execute the adaptive quadrature conversion to improve the picture quality of the reproduced image on searching.

According to the present invention there is provided a first digital video signal coding circuit for coding a digital video signal comprising: a first quadrature conversion circuit for quadrature-converting the digital video signal of a frame to provide first coefficient data; a second quadrature conversion circuit for quadrature-converting the digital video signal of fields to provide second coefficient data, the frame including the fields; a first scanning circuit for scanning the first coefficient data in a first predetermined order to produce a first data train; a second scanning circuit for scanning the second coefficient data in a second predetermined order to produce a second data train; a detection circuit for detecting which of the first and second data trains included higher frequency components; a selection circuit for adaptively selecting either of the first or second data train in accordance with the result of the detection circuit; a separation circuit for separating a data train selected by the selection circuit into at least two separated data trains with respect to the frame or fields; and a coding circuit for effecting a cording processing for data compression and error correction to the separated data trains respectively.

According to the present invention there is also provided a digital video signal decoding circuit for decoding the separated data trains as input signal comprising: a decoding circuit for decoding the input signals to provided decoded data trains; a mixing circuit for mixing the decoded data trains to reproduce the data train selected by the selection means; and a quadrature inverse conversion circuit for decoding the reproduced data train from the mixing means to reproduce the digital video signal.

According to the present invention there is further provided a second digital video signal coding circuit for coding digital video data comprising: a first quadrature conversion circuit for effecting quadrature conversion to the digital video data at every first unit area of a frame of the digital video data to produce first set of coefficient data, the frame including first and second fields; a first scanning circuit for scanning the first set of coefficient data in a first predetermined order to produce a first data train; a second quadrature conversion circuit for effecting quadrature conversion to the digital video data at every second unit area of the first field and at every third unit area of the second field to produce second and third sets of coefficient data, the first unit area corresponding to the second and third unit areas; a second scanning circuit for scanning the second and third coefficient data in a second predetermined order to produce a second data train corresponding to the first data train; a detection circuit for detecting which one of the first and second frame data trains has a smaller amount of high frequency components to produce a control signal; a selecting circuit for outputting either of the first or second data train as a third data in response to the detection circuit; a separating circuit for separating the third data train into fourth and fifth data trains; a first coding circuit for effecting a data compression coding to the fourth data train; a signal adding circuit for adding the control signal to the fourth data train from the first coding means to output a first coded video data; and a second coding circuit for effecting the data compression coding to the fifth data train to output a second coded video data.

According to the present invention there is further provided a helical scan digital video tape recorder for recording and reproducing a digital video data through a magnetic tape, having normal reproducing and searching modes, comprising: a data compression circuit for band-compressing the digital video data to produce a band-compressed data; a data rearrangement circuit for arranging a frame of the band-compressed data, the frame including first and second fields which are respectively divided vertically into first and second portions, the data rearrangement circuit sequentially outputting the frame of band-compressed data in an order of a first data train indicative of a first field of the video data at the first portion, a second data train indicative of a second field of the video data at the first portion, a third data train indicative of a first field of the video data at the second portion, and a fourth data train indicative of a second field of the video data at the second portion; a recording unit for recording the digital video data from the rearrangement means through a helical scanning which forms a slant track divided into upper and lower portions with respect to a width direction of the magnetic tape, the recording unit recording output data from the rearrangement means such that the first data train is recorded at lower portion of the slant track, the second data train is recorded at upper portion of the slant track, the third data train is recorded on an adjacent slant track which is adjacent to the slant track at lower portion of the adjacent slant track, the fourth data train is recorded at the upper portion of the adjacent slant track, the first to fourth data trains being recurrently recorded; a reproducing unit for reproducing the first to fourth data trains recorded on the magnetic tape through the helical scanning in the normal reproducing mode; a second rearrangement circuit for arranging the reproduced first to fourth data trains to reproduce the output data; a searching unit responsive to a searching command for reproducing the first to fourth data trains in the searching mode, having a data processing circuit for neglecting the reproduced second and fourth data trains; a data expansion circuit for band-expanding an output of the second rearrangement circuit to reproduce the digital video data in the normal reproducing unit and for band-expanding an output of the searching unit to produce an image for the searching mode in the searching mode.

BRIEF DESCRIPTION OF THE DRAWINGS

The object and features of the present invention will become more readily apparent from the following detailed description taken in conjunction with the accompanying drawings in which:

FIG. 1B is a partial block diagram of the first embodiment of a quadrature conversion circuit and variable length coding circuits shown in FIG. 1A;

FIG. 7A is an illustration of the first and second embodiments for showing data trains after zigzag scanning;

FIG. 7B is an illustration of the first and second embodiments for showing an even number$^{th}$ data train after separation;

FIG. 7C is an illustration of the first and second embodiments for showing an odd number$^{th}$ data train after the separation;

FIG. 7D is an illustration of the second embodiment for showing an operation of the combining circuit shown in FIG. 3A;

FIG. 7E is an illustration of the second embodiment for showing an output data of the combining circuit and mixing circuit;

FIG. 8 is an illustration of the second embodiment for showing head loci and the region where the video signal is effectively reproduced when the 2.5-times speed searching and reproduction is carried out;

The same or corresponding elements or parts are designated as like references throughout the drawings.

DETAILED DESCRIPTION OF THE INVENTION

Hereinbelow will be described a first embodiment of this invention.

Figure 1A:
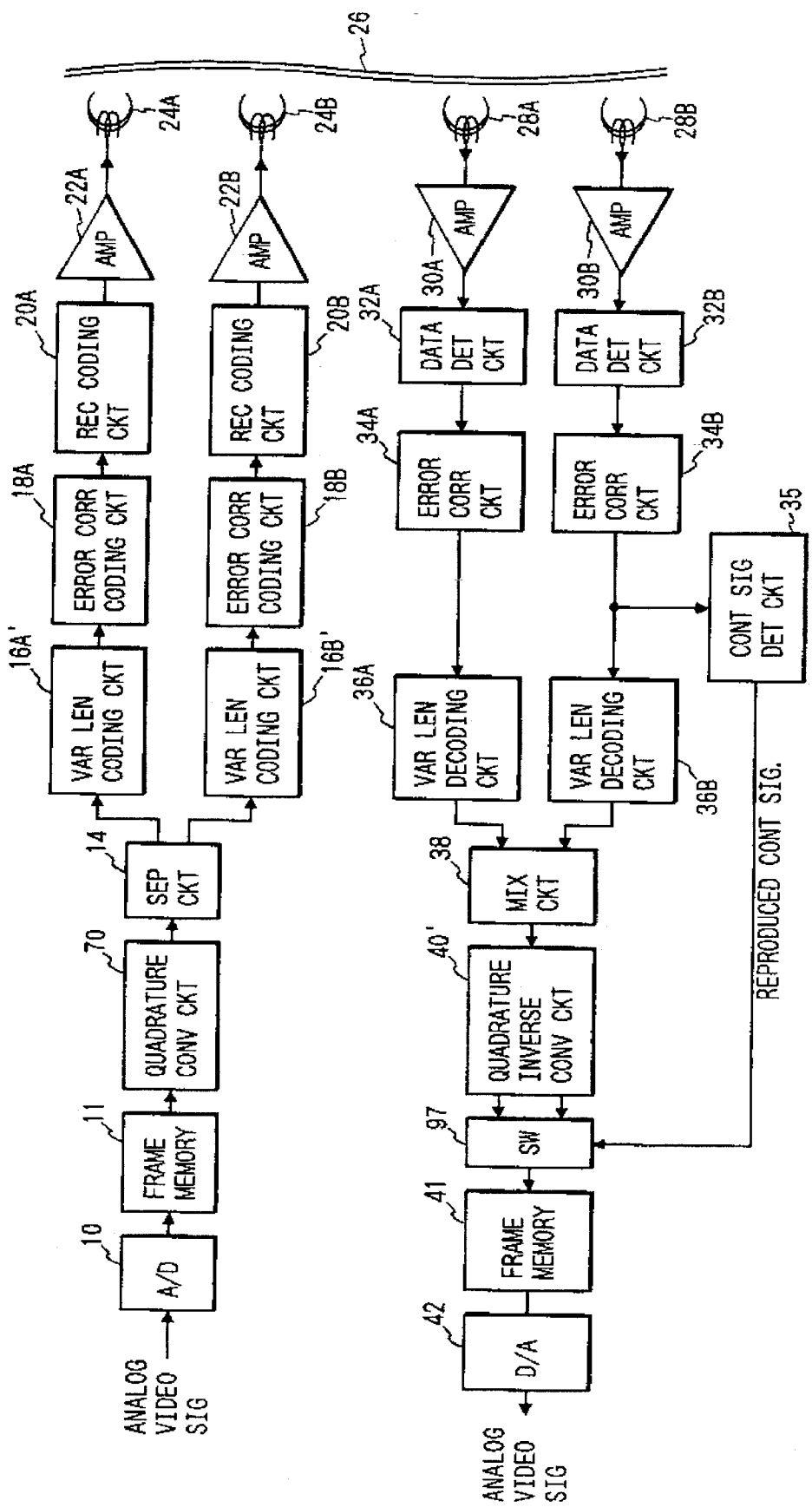
FIG. 1A is a block diagram of the first embodiment of a digital video signal coding circuit and decoding circuit used in a digital VTR.
Figure 14:
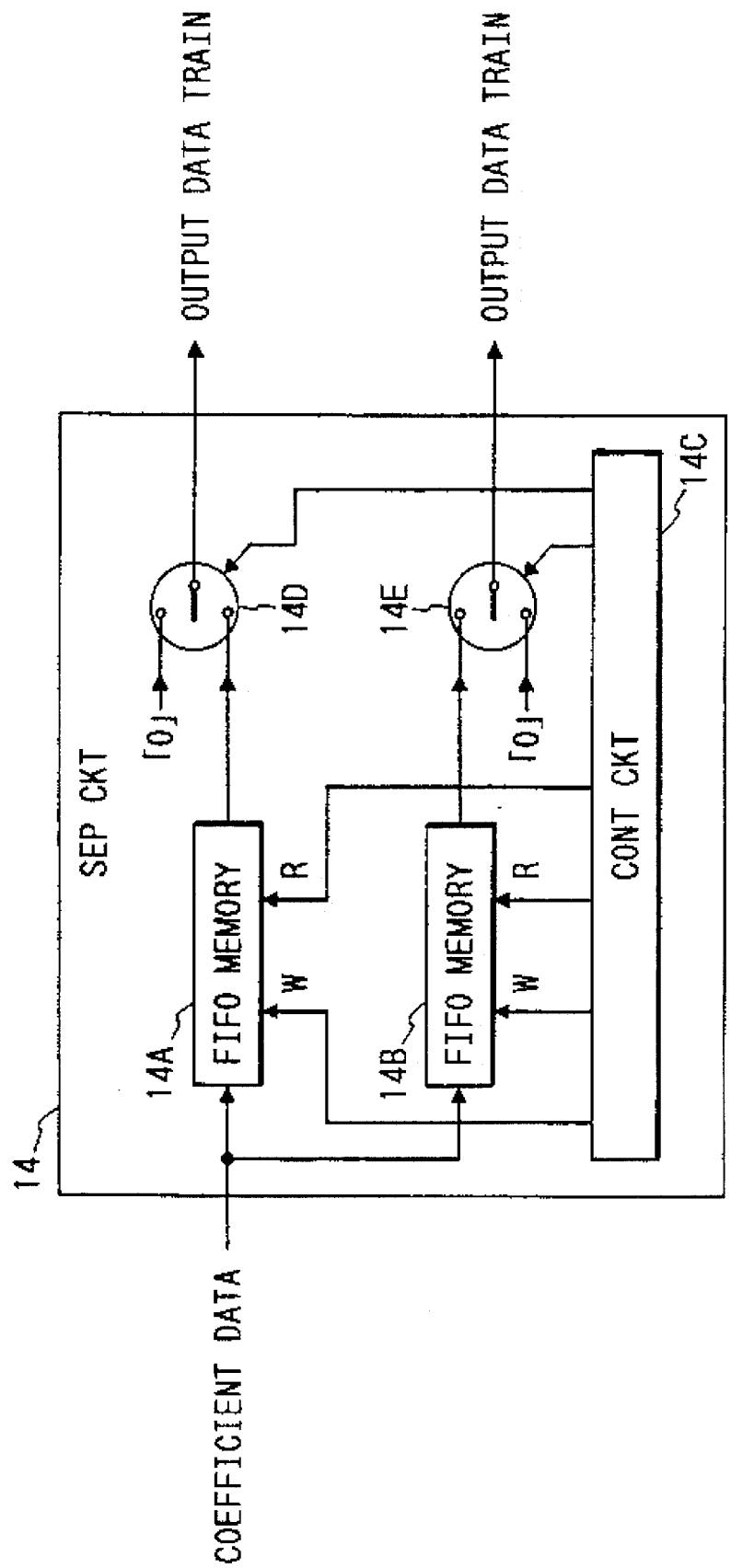
FIG. 14 is a block diagram of a prior art example of the separating circuit shown in FIG. 10.

FIG. 1A is a block diagram of the first embodiment of a digital video signal coding circuit and decoding circuit used in a home use digital VTR. FIG. 1B is a partial block diagram of the first embodiment of a quadrature conversion circuit 70 and variable length coding circuits 16A' and 16B' shown in FIG. 1A. The basic structure is similar to the prior art digital video signal coding circuit and decoding circuit shown in FIG. 10. However, there is the difference in the quadrature conversion circuit 70 having a structure shown in FIG. 1B and quadrature inverse conversion circuit 40'. In FIGS. 1A and 1B, an analog video signal is inputted to an A/D converter 10 for converting the analog video signal into a digital video signal. Then, the digital video signal is supplied to a frame memory 11 for temporary storage of the digital video signal for DCT conversion. The stored digital video signal is supplied to a quadrature conversion circuit 70. An output of the quadrature conversion circuit 70 is supplied to a separation circuit 14 for separating the coefficient data into odd number$^{th}$ data and even number$^{th}$ data trains. FIG. 14 is a block diagram of an example of the prior art separating circuit 14 described earlier, which is the same as the separating circuit 14 of the first embodiment. As mentioned earlier, in FIG. 14, the first data D(0) of the DCT coefficient data zigzag-scanned is written into either of FIFO memories 14A and 14B, for example, the FIFO memory 14A. The next second data D(1) is written into the FIFO memory 14B. Similarly, the following data D(2), D(3), D(4), . . . are written in to FIFO memories 14A and 14B alternately. That is, even number$^{th}$ data is stored in the FIFO memory 14A as an even number$^{th}$ data train and odd number$^{th}$ data is stored in the FIFO memories 14B as an odd number$^{th}$ data train.

Then, each data train separated by the FIFO memories 14A and 14B is supplied to each of data addition switches 14D and 14E. In these switches, data "0" is added to thirty-third to sixty-fourth data of each data train including thirty-two data. Therefore, if the above-mentioned processing is effected to the first to sixty-fourth data which are assumed to be other than "zero", data other than "0" exist at only from first to thirty-second data and two sets of data trains, each having possibility of the number of data other than "0" is a half of the number before the processing, are obtained. A control circuit 14C effects the writing and the reading of data in each of memories 14A and 14B and the switching control of switches 14D and 14E.

FIG. 7A is an illustration of the first embodiment for showing data trains after zigzag scanning, FIG. 7B is an illustration of the first embodiment for showing an even number$^{th}$ data train after the separation, and FIG. 7C is an illustration of the first embodiment for showing an odd number$^{th}$ data train after the separation. These FIGS. 7A to 7C are also used in the second embodiment of this invention.

The even and odd number$^{th}$ coefficient data trains as shown in FIGS. 7A and 7B produced as mentioned are supplied to variable length coding circuits 16A' and 16B' respectively as shown in FIG. 1A. The variable length coding circuit 16A' comprises a coding amount control circuit 62A, a quantizer 60A, and a two-dimensional Huffman coding circuit 64A and the variable length coding circuit 16B' comprises a coding amount control circuit 62B, a quantizer 60B, and a two-dimensional Huffman coding circuit 64B as shown in FIG. 1B. Then, quantizers 60A and 60B effect the quantization processing for approximating the coefficient data trains with discrete levels respectively. Coarseness of the quantizing levels is controlled by the coding amount control circuit 62A and 62B, that is, these circuits provides so-called non-linear quantization.

Then, the quantized coefficient data trains are supplied to the two-dimensional Huffman coding circuits 64A and 64B respectively. Then, the variable length coding processings are effected wherein a short code is assigned to a level where a degree of occurrence frequency is high. Concretely, the two-dimensional Huffman coding for two-dimensionally assigning of codes through combining a zero-run-length and a value of coefficient data after the quantizing is effected. Outputs of the two-dimensional Huffman coding circuits 64A and 64B are supplied to signal adding circuits 65A and 65B' respectively. The signal adding circuit 65A adds the control signal to the output of the two-dimensional huffman coding circuit 64A. The signal adding circuit 65B adds the control signal to the output of the two-dimensional huffman coding circuit 64B. More specifically, the signal adding circuits 65A and 65B add the control signal at the end of coding by the two-dimensional Huffman coding circuits 64A and 64B respectively. That is, the control signal is superimposed between two consecutive coded data. A system controller controls respective circuits.

Then, output signals of the variable length coding circuits 16A' and 16B' are further subjected to coding for error correction by the error correction coding circuits 18A and 18B and coding for recording by record coding circuits 20A and 20B. Then, data after final coding is recorded simultaneously by recording heads 24A and 24B on a video tape 26 after amplification by amplifiers 22A and 22B. Here, these heads 24A and 24B are provided side by side on a rotary cylinder, so that both heads 24A and 24B record the data substantially at the same time, in parallel dual tracks, which tracks are shown in FIGS. 4 and FIG. 8 as described later.

Then, the reproducing side will be described. Data reproduced by reproducing heads 28A and 28B from the video tape 26 is amplified by amplifiers 30A and 30B and then, supplied to data detection circuits 32a and 32B for detecting video data other than synchronizing signals and control signals. Then, error detection and correction by error correction circuits 34A and 34B detect errors and correct the errors and then, variable length code decoding circuits 36A and 36B decode the corrected data. Outputs of the error correction circuit 34A and 34B are supplied to variable length decoding circuits 36A and 36B. The output of the error correction circuit 34B is also supplied to a control signal detection circuit 35. The control signal detection circuit 35 detects the reproduced control signal which was originally generated by the control circuit 70G. The reproduced control signal may be detected from the output of the error correction circuit 34A. The detected reproduced control signal is supplied to a switch 97 mentioned later. The variable length decoding circuits 36A and 36B effect the variable length decoding, which is reverse to that of the variable coding circuits 16A' and 16B', to the output of the error correction circuits 34A and 34B. The decoded data from the variable length decoding circuits 36A and 36B are mixed by a mixing circuit 38, that is, a reverse processing to the separation circuit 14 is effected.

Figure 3A:
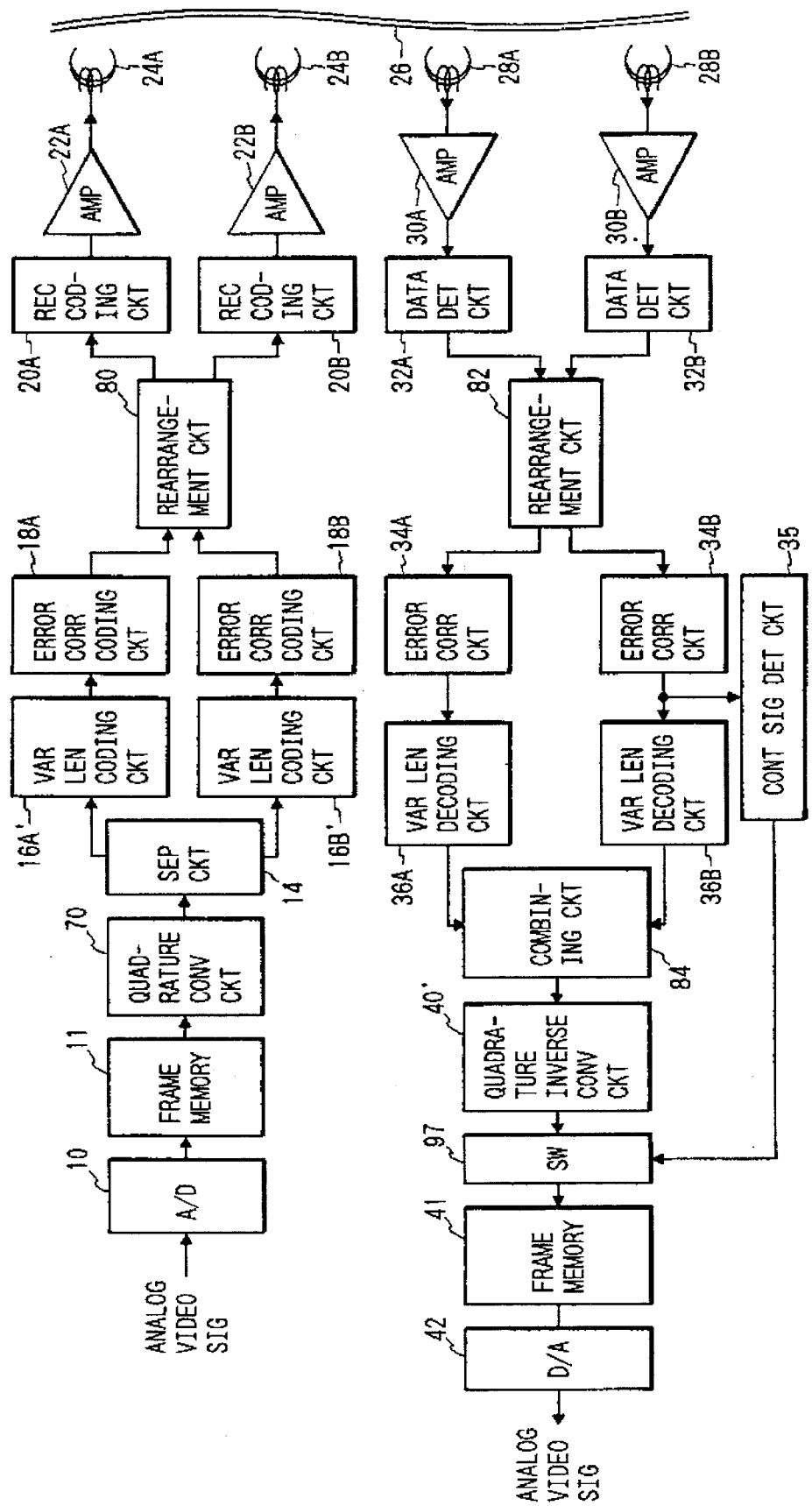
FIG. 3A is a block diagram for showing a circuit structure of the second embodiment.
Figure 15:
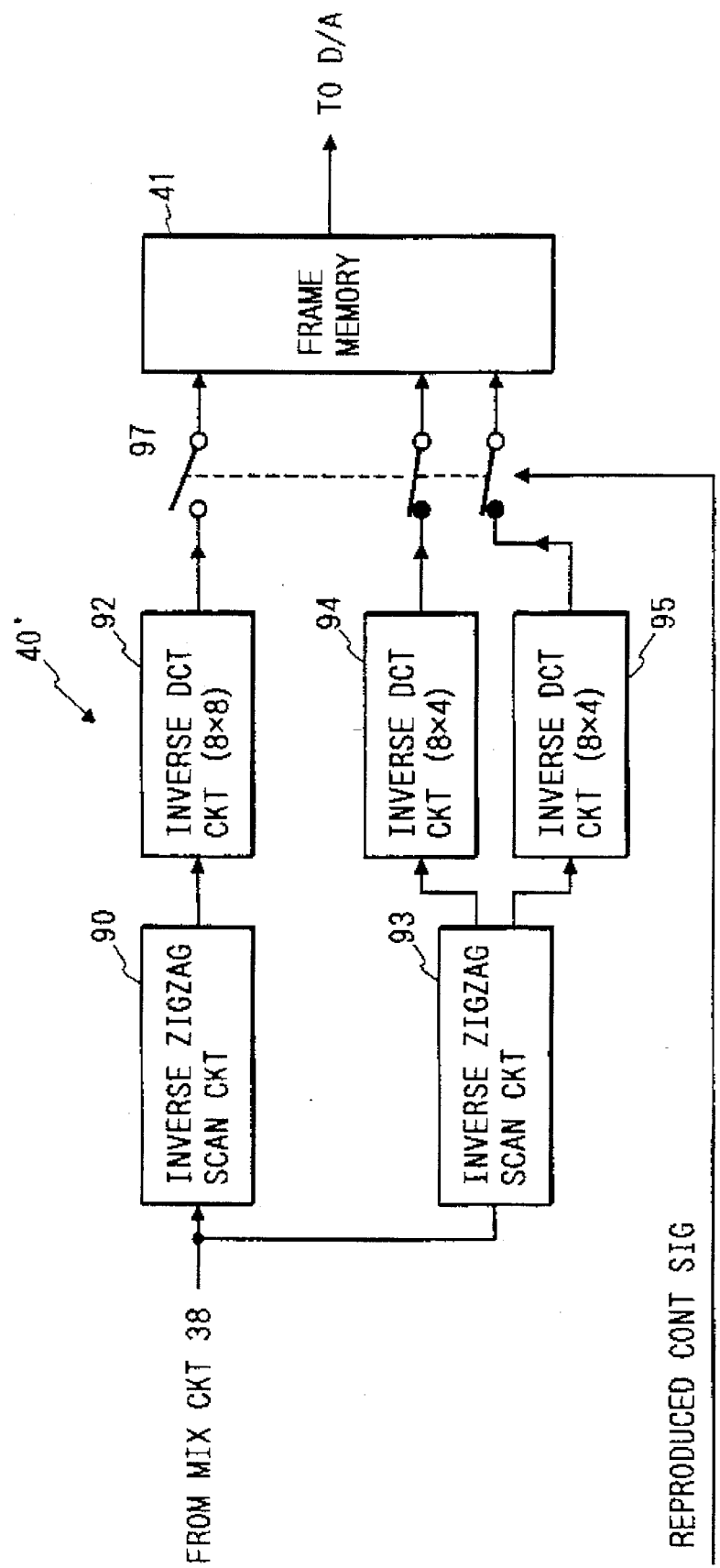
FIG. 15 is a block diagram of the first and second embodiments for showing the quadrature inverse conversion circuit and a switch circuit shown in FIGS. 1A and 3A.

Data trains after mixing are decoded by a quadrature inverse conversion circuit 40', i.e., a quadrature inverse conversion which is reverse to the DCT conversion effected by the quadrature conversion circuit 70 is effected. FIG. 15 is a block diagram of the first and second embodiments for showing the quadrature inverse conversion circuit 40' and a switch circuit 97 shown in FIG. 1A, which is also shown in FIG. 3A. The first output of the quadrature inverse conversion circuit 40' produced by an inverse DCT circuit (8×8 pixels) and second outputs of the quadrature inverse conversion circuit produced by two inverse DCT circuit (8×4)

are supplied to a switch circuit 97 which selects either of first and second outputs of the quadrature inverse conversion circuit. Further, the decoded digital video signal is supplied to a frame memory 41 to reproduce a frame of images from the first or second outputs of the quadrature inverse conversion circuit 40'. Because the second outputs represent first and second field of an reproduced image, the frame memory 41 stores these second outputs alternately to form the frame of the reproduced image. Whereas, because the first output is for the frame image, the frame memory stores the first output as it is. The output of the frame memory 41 is converted into an analog video signal by a D/A converter 42. As mentioned, the decoding of data from the reproduced video data is effected.

The difference between the prior art shown in FIG. 10 and this invention will be described more specifically. FIG. 1B is a partial block diagram of the first embodiment showing a structure of the quadrature conversion circuit 70 and the variable length coding circuits 16A' and 16B'.

Figure 2:
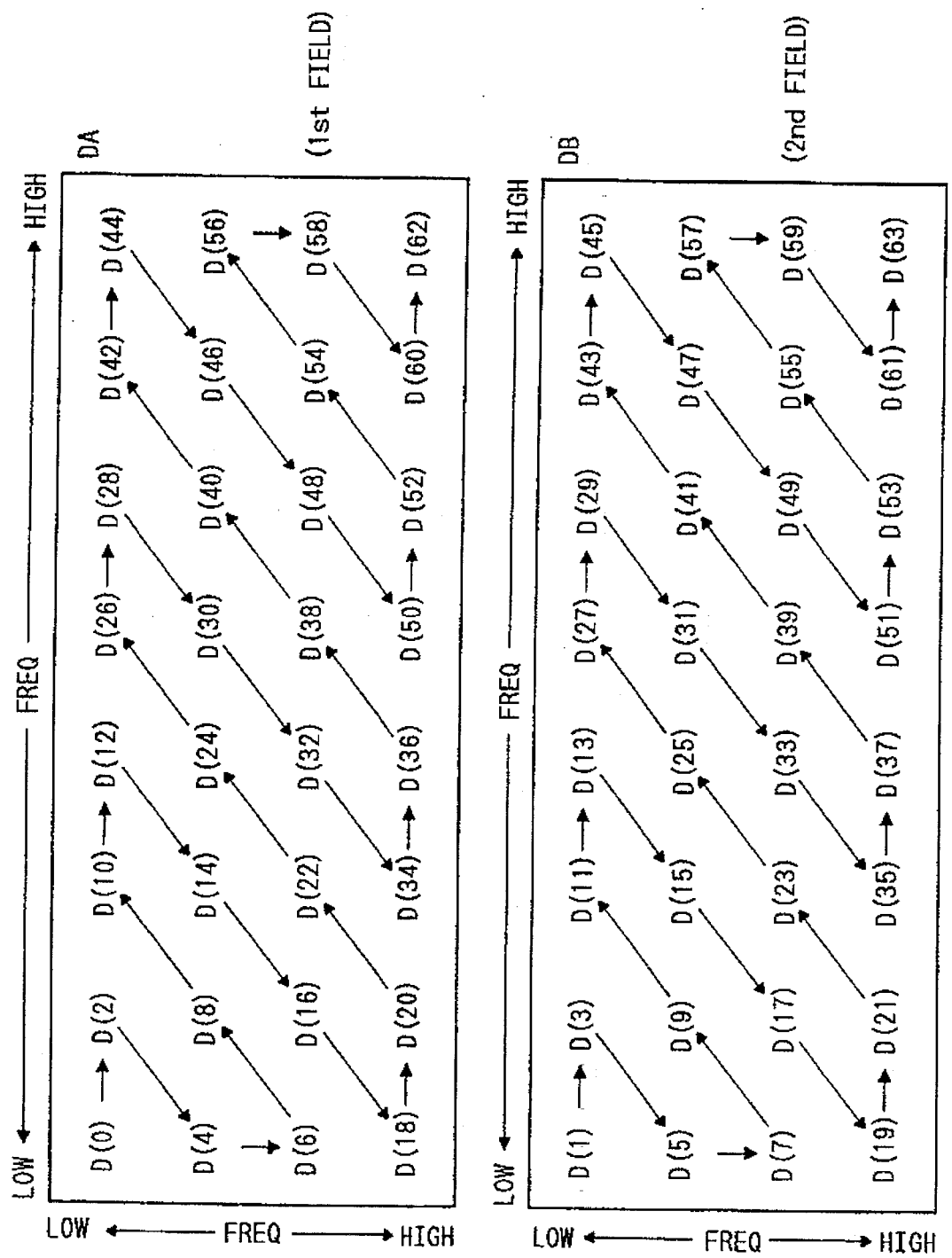
FIG. 2 are illustrations of the first embodiment for showing sets of coefficient data provided by the DCT circuits shown in FIG. 1B.

The quadrature conversion circuit 70 comprises a DCT circuit 70A for effecting DCT processing at each unit area having 8×8 pixels, a DCT circuit 70B for effecting DCT processing to even field video data to provide coefficient data at each unit area having 8×4 pixels, a DCT circuit 70C for effecting DCT processing to odd field video data to provide coefficient data at each unit area having 8×4pixels, a zigzag scan circuit 70D for zigzag-scanning coefficient data in the DCT circuit 70A, a zigzag scan circuit 70E for zigzag-scanned coefficient data in the DCT circuits 70B and 70C, a control circuit 70G for producing a control signal indicative of which data train from zigzag scan circuit 70D or the zigzag scan circuit 70E has a fewer amount of high frequency components, and selection circuit 70F for selecting data train from zigzag scan circuit 70D or zigzag scan circuit 70E in response to the control signal to select the data train having a fewer amount of high frequency components from zigzag scan circuit 70D or the zigzag scan circuit 70E. FIG. 2 are illustrations of the first embodiment for showing sets of coefficient data DA and DB provided by the DCT circuits 70B and 70C respectively. Data DA represents coefficient data of the video data of an even field and data DB represents coefficient data of the video data of an odd field. These coefficient data are formed to have an order of increasing in frequency.

Figure 10:
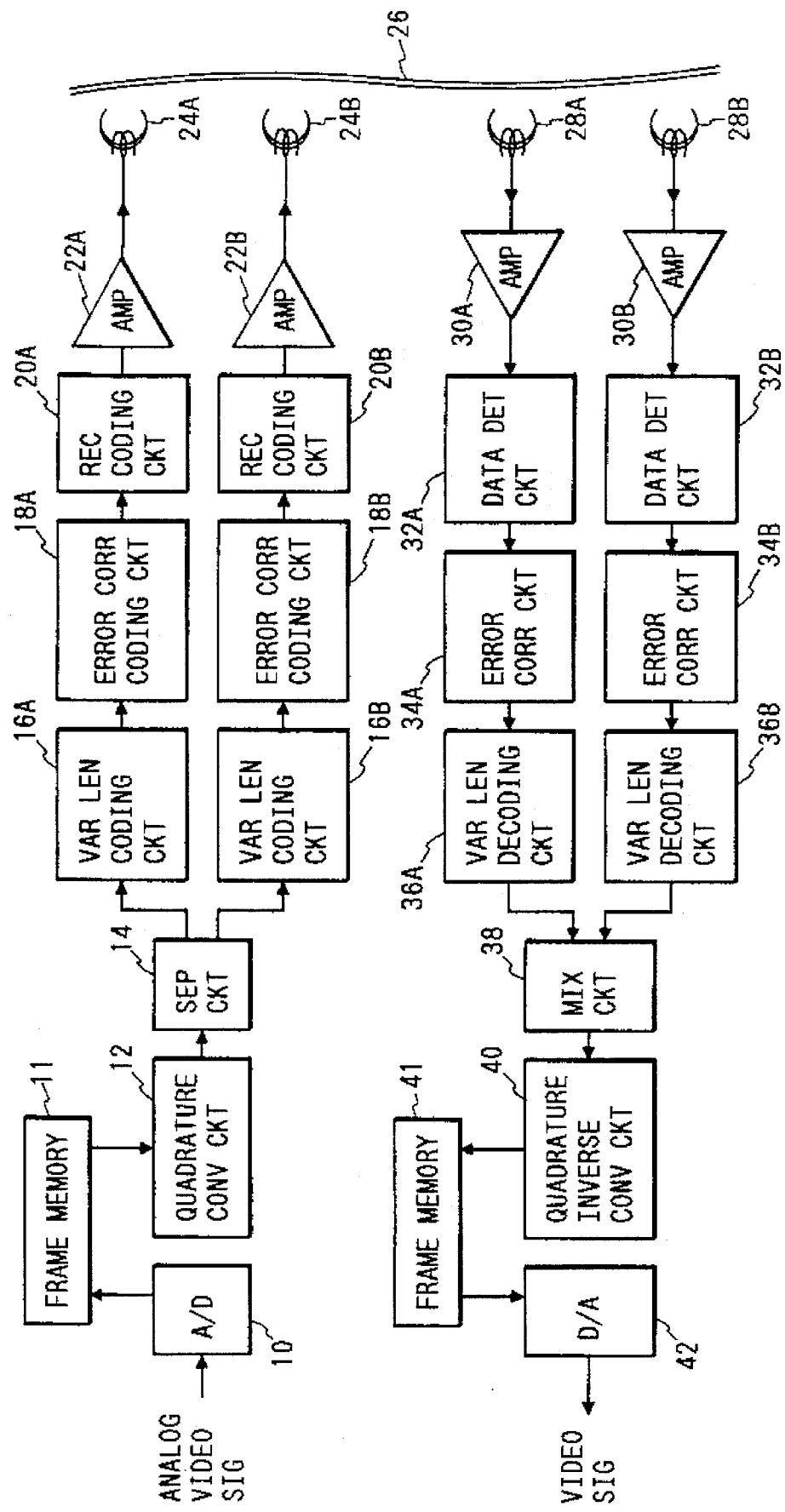
FIG. 10 is a block diagram of an example of a prior art digital coding circuit and decoding circuit used in a prior art digital VTR.
Figure 12:
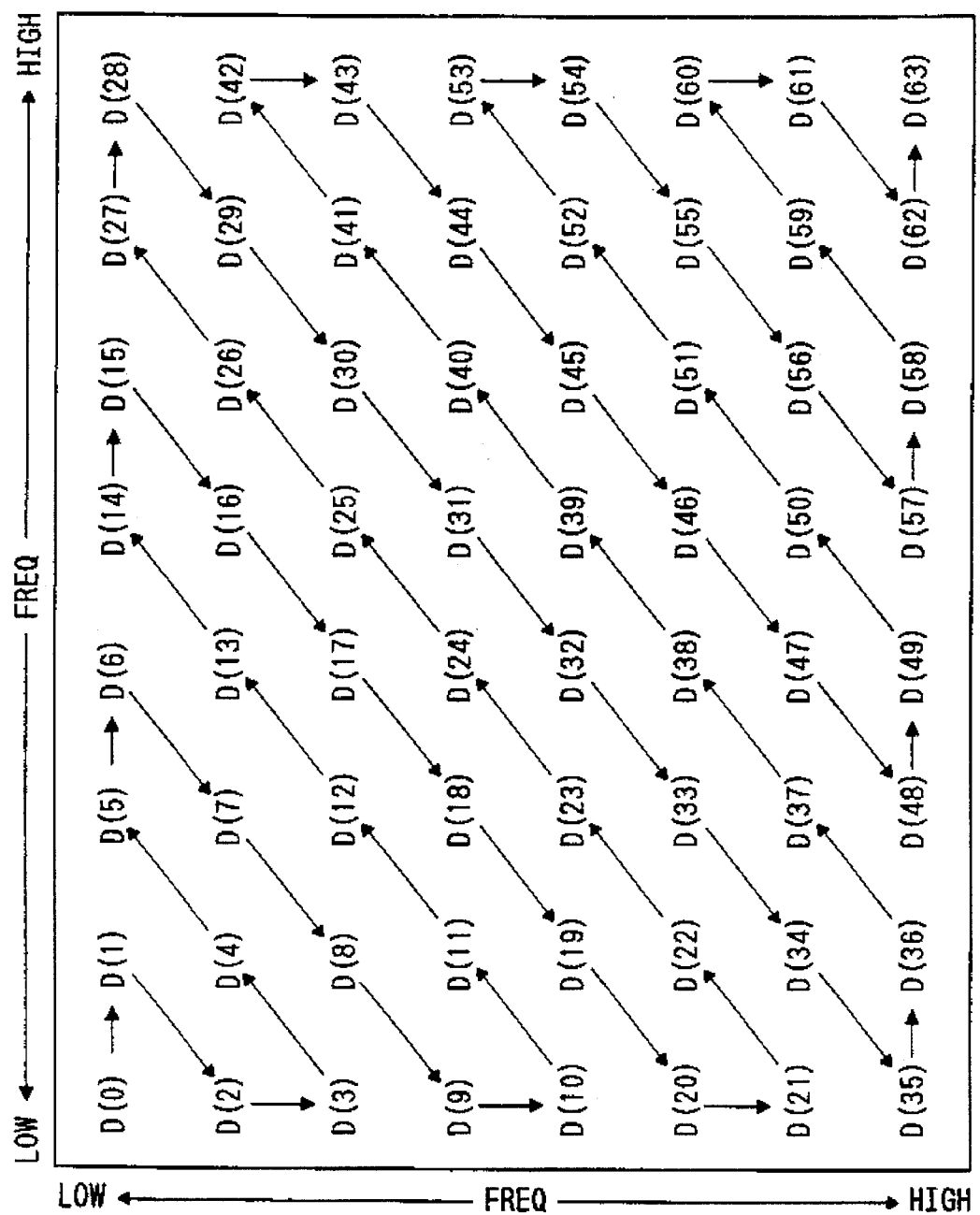
FIG. 12 is an illustration for showing a prior art zigzag scanning.
Figure 13B:
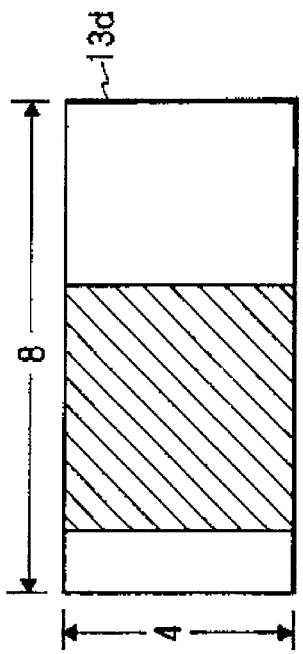
FIGS. 13A–13D are illustrations of prior art for showing partial images on a screen or extracted images.
Figure 13D:
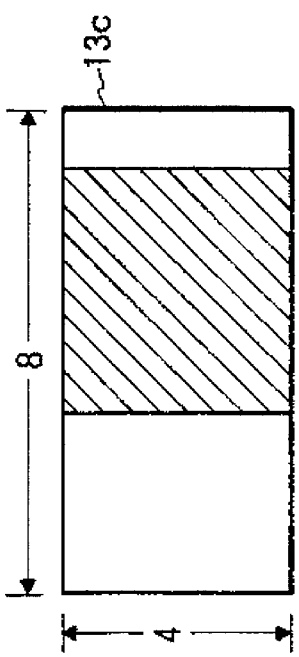
Figure 13A:
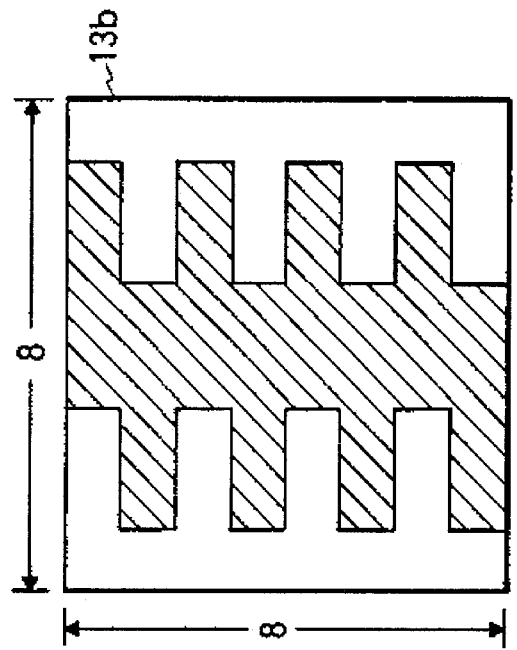
Figure 13C:
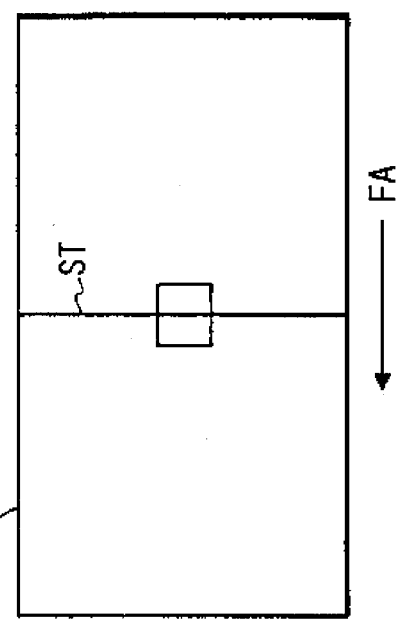

The zigzag scanning circuit 70A scans coefficient data similar to the prior art DCT circuit 50 as shown in FIG. 12 which is used for describing the prior art shown in FIG. 10. An output of the zigzag scan circuit 70D is supplied to the control circuit 70G and to a selection circuit 70F.

An output of the selection circuit 70F is connected to the separation circuit 14 which is the same as that shown in FIG. 10.

Figure 11:
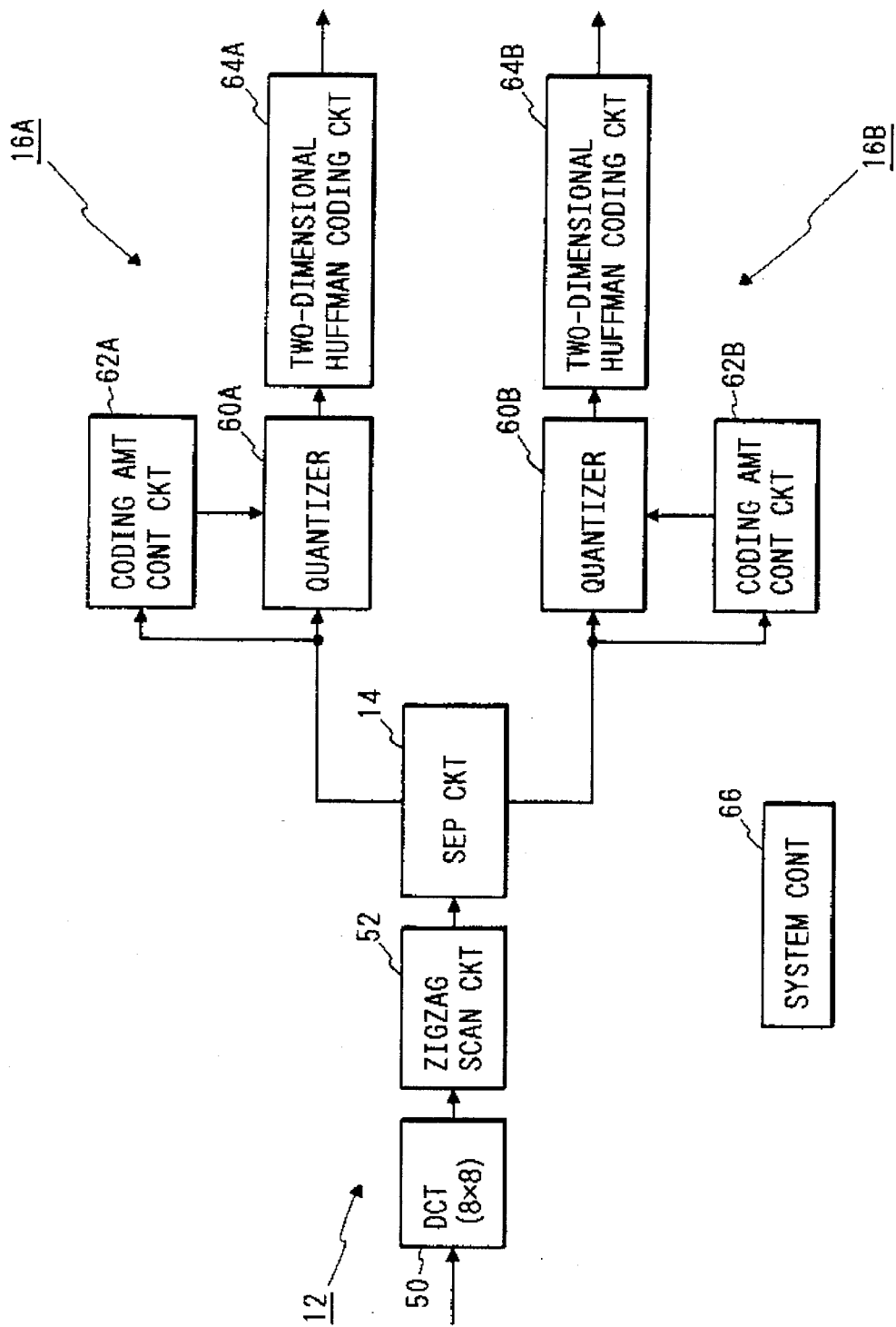
FIG. 11 is a partial block diagram of the prior art digital coding circuit shown in FIG. 10.

The DCT circuit 70A effects the DCT processing to 8×8 pixels as similarly to the prior art DCT circuit 50 shown in FIG. 11. On the other hand, the DCT circuits 70B and 70C effect DCT processing to 8×4 pixels on each field. The unit areas 8×4 of the DCT circuits 70B and 70C correspond to the unit area 8×8 of the DCT circuit 70A.

On the other hand, the DCT circuit 70B effects the DCT processing of video data of a first field at each unit area 8×4 pixels to provide coefficient data group DA as shown in FIG. 2. Similarly, the DCT circuit 70C effects the DCT processing of video data of a second field at each unit area 8×4 pixels to provide coefficient data group DB as shown in FIG. 2.

The zigzag scan circuit 70D effects the zigzag scanning of DCT coefficient data D(n) in the order as shown in FIG. 12 similar to the prior art zigzag scan circuit 52. Whereas the zigzag scan circuit 70E effects a zigzag scanning such that the zigzag scan circuit 70E outputs data D(0) in the coefficient data group DA and then data D(1) in the coefficient data group DB. That is, the zigzag scan circuit 70E scans alternately between the DCT circuits 70B and 70C. AS the result, the zigzag scan circuit 70E outputs coefficient data in the order D(0) to D(63) successively.

The control circuit 70G produces the control signal indicative of which data train from zigzag scan circuit 70D or the zigzag scan circuit 70E has a fewer amount of high frequency components as follows:

The control circuit 70G compares some pairs of corresponding data in the coefficient data from the zigzag scan circuit 70D and 70E. That is, for example, a pair of corresponding data data (0) of the coefficient data from the zigzag scan circuit 70D and data (0) of the coefficient data from the zigzag scan circuit 70E are compared and some other pairs of corresponding data having corresponding number are compared. Then, the control circuit 70G counts up the first number of the corresponding data from the zigzag scan circuit 70D having larger value than that in the coefficient data from the zigzag scan circuit 70E and counts up the second number of the corresponding data from the zigzag scan 70E having larger value than that in the coefficient data from the zigzag scan 70D. Then, the control circuit 70G compares the first and second numbers. If the first number is larger than the second number, the control circuit 70G outputs the control signal indicative of selecting the coefficient data from the zigzag scan circuit 70D.

The selection circuit 70F for selecting data train from zigzag scan circuit 70D or zigzag scan circuit 70E in response to the control signal to select the data train having a fewer amount of high frequency components from zigzag scan circuit 70D or the zigzag scan circuit 70E. As mentioned, the control circuit once effects the detection, so that the selection circuit 70F comprises a memories for the zigzag scan circuit 70D and 70E and output either of data from the zigzag scan circuit 70D or 70E after reception of the control signal.

Data outputted by the selection circuit 70F are supplied to the separation circuit 14. The separation circuit 14 separate the output data into even and odd $number^{th}$ data. The even $number^{th}$ data are supplied to the variable length coding circuit 16A' and odd $number^{th}$ data are supplied to the variable length coding circuit 16B'. That is, even $number^{th}$ data D(0), D(2), D(4), D(6), D(8), . . . are supplied to the variable length coding circuit 16A'. On the other hand, odd $number^{th}$ data D(1), D(3), D(5), D(7), D(9), . . . are supplied to the variable length coding circuit 16B'. Here, when the selection circuit 70F selects either coefficient data from zigzag scan circuit 70D or 70E, the separation circuit 14 separates the coefficient data similarly. That is, the separation circuit 14 always outputs even $number^{th}$ data to the variable length coding circuit 16A' and odd $number^{th}$ data to the variable length coding circuit 16B'.

The variable length coding circuit 16A' comprises coding amount control circuit 62A, quantizer 60A, two-dimensional Huffman coding circuit 64A, and a signal adding circuit 65A. Similarly, the variable length coding circuit 16B' comprises coding amount control circuit 62B, quantizer 60B, a two-dimensional Huffman coding circuit 64B, and a signal adding circuit 65B, as shown in FIG. 1B. On receiving of the even and odd $number^{th}$ data, the quantizers 60A and 60B effect the quantization processing for approximating the coefficient data trains with discrete levels respectively. Coarseness of the quantizing levels is controlled by the coding amount control circuit 62A and 62B, that is, these circuits provides so-called non-linear quantization.

Then, the quantized coefficient data trains are supplied to the two-dimensional Huffman coding circuits 64A and 64B respectively. Then, the variable length coding processings are effected wherein a short code is assigned to a level where a degree of occurrence frequency is high. Concretely, the two-dimensional Huffman coding for two-dimensionally assigning of codes through combining a zero-run-length and a value of coefficient data after the quantizing is effected. Outputs of the two-dimensional Huffman coding circuits 64A and 64B are supplied to the signal adding circuits 65A and 65B. Each of signal adding circuits 65A and 65B adding the control signal to the two-dimensional Huffman coded signal to have a predetermined data order. A system controller 66' controls respective circuits.

Then, output signals of the variable length coding circuit 16A' and 16B' are further subjected to coding for error correction by the error correction coding circuits 18A and 18B and coding for recording by record coding circuits 20A and 20B and are recorded by head 24A and 24B on the magnetic tape 26 through the amplifiers 22A and 22B respectively. That is, the coded data train separately recorded through the recording processing on the video tape 26. Here, if the recording is effected by the helical scanning system, the record coding circuits 20A and 20B output coded data such that the heads 24A and 24B record the coded data on different tracks successively through a time adjusting technique. That is, the tracks for even field data and odd field data are recurrently formed on the video tape 26.

Then, the reproducing side will be described. The data recorded on the video tape 26 are reproduced by heads 28A and 28B which are provided side by side on a rotary cylinder (not shown). The data reproduced by reproducing heads 28A and 28B from the video tape 26 are amplified by amplifiers 30A and 30B and then, supplied to data detection circuits 32a and 32B for detecting video data other than synchronizing signals respectively. Then, error detection and correction by error correction circuits 34A and 34B detect errors and correct the errors. Here, if the recording is effected by the helical scanning system, the time difference in the reproduced signals by the reproduced by the head 28A and 28B from recurrently recorded tracks is adjusted. However, the heads 28A and 28B are provided side by side on the rotary cylinder (not shown), this time difference is not necessary. An output of the error correction circuit 34A is directly supplied to a variable length decoding circuit 36A. Whereas an output of the error correction circuit 34B is also supplied to a control signal detection circuit 35 for detecting the control signal which is generated by the control circuit 70G, added to the coded data by the signal adding circuit 65B, recorded by the head 24B, and reproduced by the head 28B to supply a reproduced control signal to quadrature inverse conversion circuit 40'. The variable length decoding circuits 36A and 36B respectively effect the variable inverse decoding which is reverse to the variable coding effected by the variable coding circuits 16A' and 16B'. The decoded data by the variable length decoding circuits 36A and 36B are mixed by a mixing circuit 38, that is, a reverse processing to the separation circuit 14 is effected. Thus, each of even and odd number$^{th}$ data are alternately arranged to form a series data train.

FIG. 15 is a block diagram of this embodiment for showing the quadrature inverse conversion circuit 40'.

The series data trains after mixing are decoded by a quadrature inverse conversion circuit 40', i.e., a quadrature inverse conversion which is reverse to the DCT conversion is effected. The quadrature inverse conversion circuit 40' comprises an inverse zigzag scan circuit 90, an inverse DCT circuit 92, an inverse zigzag scan circuit 93, a first inverse DCT circuit 94, a second inverse DCT circuit 95, and a switch circuit 97. The inverse zigzag scan circuit 90 effects the inverse zigzag scanning to data signal from the mixing circuit 38 to arrange the data signal on the inverse DCT circuit 92 as coefficient data at every 8×8 pixels. The inverse zigzag scan circuit 93 effects the inverse zigzag scanning to the data from the mixing circuit 38 to alternately arrange each data in the inverse DCT circuits 94 and 95 as coefficient data, each inverse DCT receiving data of 8×4 pixels. The inverse DCT circuit 94 receives the data of an even field from the mixing circuit 38. The inverse DCT circuit 95 receives the data of an odd field from the mixing circuit 38. Outputs of the inverse DCT circuits 92, 94, and 95 are supplied to the switch circuit 97 for selecting either of these outputs in response the reproduced control signal. The switch circuit 97 selects the output of the inverse DCT circuit 92, when the control signal indicates that coefficient data in the inverse DCT circuit 92 are to be outputted. When the control signal indicates that coefficient data in the inverse DCT circuit 94 and 95 are to be outputted, the switch circuit 97 selects the outputs of the inverse DCT circuits 94 and 95.

An output of the switch circuit 97 is supplied to a frame memory 41 to form a frame image. An output of the frame memory 41 is converted into an analog video signal by a D/A converter 42. As mentioned, the decoding of data from the reproduced video data is effected.

As mentioned, this embodiment suitably provides adoptive switching between two-dimensional DCTs of 8×8 pixels and 8×4 pixels.

Then, a second embodiment of this invention will be described. This invention is suitable for the reproducing during the searching operation. FIG. 3A is a block diagram for showing a circuit structure of the second embodiment. In FIG. 3A, on the recording side, circuits from the A/D converter 10 to the error correction coding circuits 18A and 18B are the same as the first embodiment mentioned above.

Outputs of the error correction coding circuits 18A and 18B are supplied to a rearrangement circuit 80 respectively. An output of the rearrangement circuit is supplied to the record coding circuits 20A and 20B. The coded data from the record coding circuits 20A and 20B are recorded on the video tape 26 through the amplifiers 22A and 22B and recording heads 24A and 24B respectively to obtain a predetermined tape format mentioned later.

Then, the structure of the reproducing side will be described. Reproduced video data by the reproducing heads 28A and 28B from the video tap 26 are supplied to the amplifiers 30A and 30B respectively. The amplified data signals from the amplifiers 30A and 30B are supplied to the data detection circuits 32A and 32B respectively. Outputs of the data detection circuits 32A and 32B are supplied to a rearrangement circuit 82. Outputs of this rearrangement circuit 82 are supplied to the error correction circuit 34A and 34B. Outputs of the error correction circuits 34A and 34B are supplied to variable length coding decoding circuits 36A and 36B respectively. Here, the output of the error correction circuit 34B is also supplied to a control signal detection circuit 35. The control signal detection circuit 35 detects the control signal recorded on the video tape 26 and supplies the reproduced control signal to a switching circuit 97 mentioned later. On the other hand, outputs of the variable code decoding circuits 36A and 36B are supplied to a combining circuit 84. An output of the combining circuit 84 is supplied to the quadrature inverse conversion circuit 40' for reproducing the output of the quadrature conversion circuit 70. An output of the quadrature inverse conversion circuit 40' is supplied to a frame memory through the switching circuit 97. An output of the frame memory 12 is supplied to a D/A converter 42 for supplying an output reproduced analog video signal.

Figure 4A:
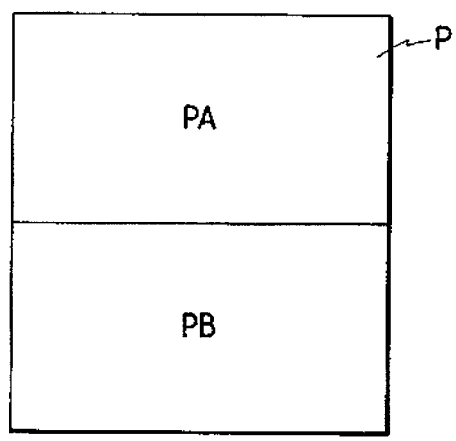
FIG. 4A is an illustration of the second embodiment for showing a frame image.
Figure 4B:
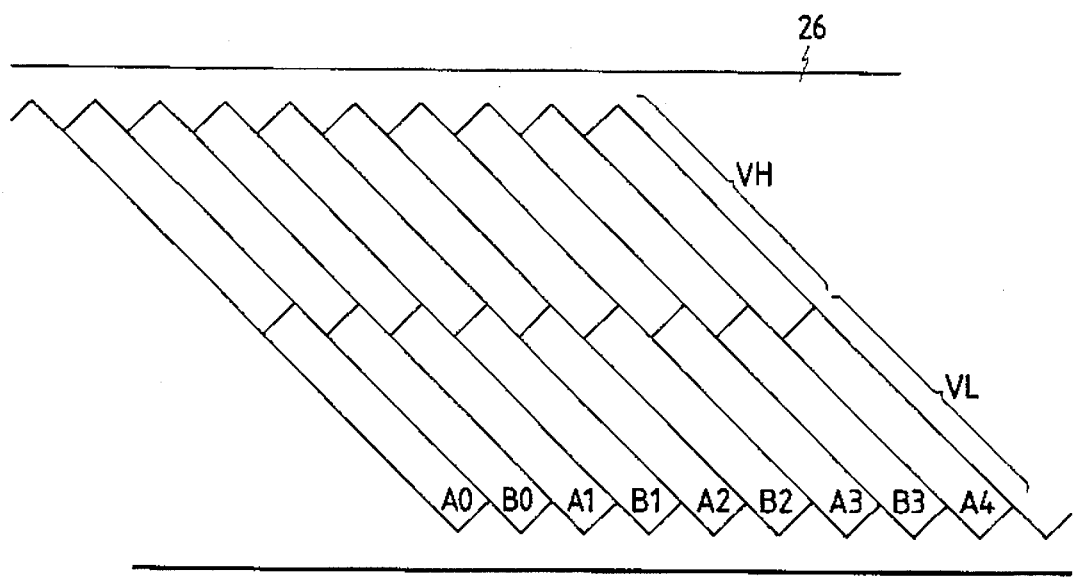
FIG. 4B is an illustration of the second embodiment for showing a tape format.

FIG. 4A is an illustration of the second embodiment for showing a frame image. FIG. 4B is an illustration of the second embodiment for showing a tape format. The rearrangement circuit 80 of the recording side receives the even number$^{th}$ data trains from the error correction coding circuit 18A and the odd number$^{th}$ data trains from the error correction coding circuit 18B and outputs the even number$^{th}$ data trains and the even number$^{th}$ data trains in series by arranging each of even number$^{th}$ data trains and each of odd number$^{th}$ data trains alternately again.

In this embodiment, as shown in FIG. 4A, an image P is separated into upper and lower portions. Then, as shown in FIG. 4B, a video signal PA corresponding to the upper half portion of the image P is recorded on tracks A on the video tape 26 by the head 24A. A video signal PB corresponding to the lower half portion of the image P is recorded on tracks B on the video tape 26 by the head 24B. Here, the heads 24A and 24B have opposite azimuth each other and provided side by side on the rotary cylinder (not shown). A video signal of zero$^{th}$ frame is recorded on tracks A0 and B0 separately. A video signal of the next First frame is recorded on tracks A1 and B1 separately. Video signal the third frame and following frame the third frame are similarly recorded. Further, in this embodiment, each of the even number$^{th}$ data train is recorded at the lower region VL of each track and at the upper region VH, the odd number$^{th}$ data trains are recorded. That is, the rearrangement circuit 80 rearranges the data trains with a correspondence to such tape format and distributes data trains to the record coding circuits 20A and 20B to obtain the tape format shown in FIG. 4B.

Then, the record coding circuits 20A and 20B effect the record coding to the outputs of the rearrangement circuit 80 as similar to the record coding circuit 20A and 20B of the prior art shown in FIG. 10 and the amplifier 22 amplifies an output of the record coding circuit 20 as similar to the amplifiers 22A and 22B of the prior art shown in FIG. 10. Then, heads 24A and 24B record the coded signal on the video tape 26.

On the reproducing side, the recorded data signals are reproduced by the heads 28A and 28B. Outputs of the heads 28A and 28b are supplied to the amplifiers 30A and 30B. The amplifiers 30A and 30B amplify the reproduced signals from the head 28A and 28B. The amplifier 30 corresponds to the amplifiers 30A and 30B of the prior art shown in FIG. 10. Outputs of the amplifiers 30A and 30B are detected by the data detection circuits 32A and 32B to obtain data signals. The data detection circuits 32A and 32B corresponds to the data detection circuits 32A and 32B of the prior art shown in FIG. 10. The rearrangement circuit 82 is provided for rearrangement processing of data which is reverse to the rearrangement circuit 80 of the recording side. That is, the even number$^{th}$ data is supplied to the error correction circuit 34A and the odd number$^{th}$ data is supplied to the error correction circuit 34B.

Figure 6:
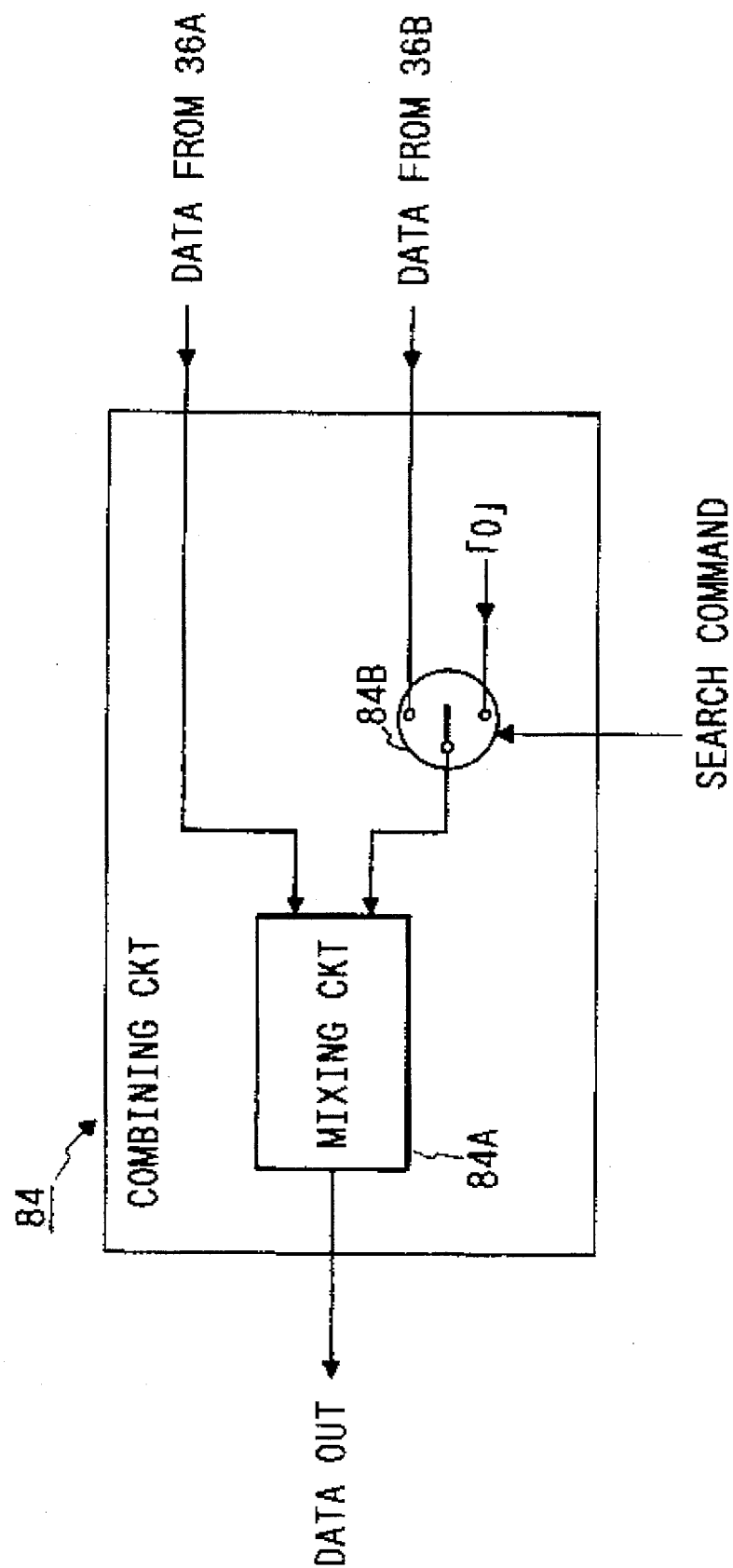
FIG. 6 is a block diagram of the second embodiment of the combining circuit shown in FIG. 3A.

FIG. 6 is a block diagram of the second embodiment of the combining circuit shown in FIG. 3A. The combining circuit 84 comprises a mixing circuit 84A and a data addition switch 84B. One input of the mixing circuit 84a is supplied with data from the variable length decoding circuit 36A, that is, even number$^{th}$ data train. One input of the data addition switch 84B is supplied with data from the variable coding decoding circuit 36B, that is, the odd number$^{th}$ data. The other input of the data addition switch 84B is supplied with data "0" and the output thereof is supplied to the other input of the mixing circuit 84A. The mixing circuit 84A is provided for effecting the reverse processing to the separation circuit 14 of the recording circuit mentioned above The data addition switch 84B is for adding data "0" in place of the odd number$^{th}$ data train on the searching and effects switching on the basis of a search command. Here, the combining circuit 84 can be also structured with a memory means as show in FIG. 14.

Then, an operation of the embodiment will be described more specifically.

NORMAL RECORDING OPERATION

At first, a normal recording operation will be described. An analog video signal is inputted to the A/D converter 10 where it is converted into a digital video signal. Then, an output of the A/D converter 10 is supplied to the quadrature conversion circuit 70 where the DCT and zigzag scanning processings are effected as similar to the first embodiment. After the zigzag scanning, the coefficient data is supplied to the separation circuit 14 where the coefficient data are separated into the even number$^{th}$ data train and the odd number$^{th}$ data train and data "0" is added thereto as describe in the first embodiment. FIG. 7A is an illustration of the first and second embodiments for showing data trains after zigzag scanning, FIG. 7B is an illustration of the first and second embodiments for showing an even number$^{th}$ data train after the separation, and FIG. 7C is an illustration of the first and second embodiments for showing an odd number$^{th}$ data train after the separation.

The even and odd number$^{th}$ data trains separated as mentioned are subjected to the variable length coding processing by the variable length coding circuits 16A'0 and 16B', the error correcting coding processing by the error correction coding circuits 18A and 18B, and rearrangement processing by the rearrangement circuit 80 in order of mention (In the first embodiment, excepting the rearrangement circuit 80).

Data after the rearrangement are coded for recording by the record coding circuits 20A and 20B and amplified by the amplifiers 22A and 22B respectively. Then, amplified data are recorded by the recording head 24A and 24B on the video tape 26. That is, the even number$^{th}$ data train of the upper image PA at the zero$^{th}$ frame is recorded on the track A0 at the region VL. The odd number$^{th}$ data train of the zero$^{th}$ frame is recorded on the track A0 at the region VH. Moreover, the even number$^{th}$ data train of the lower image PB at the zero$^{th}$ frame is recorded on the track B0 at the region VL. The odd number$^{th}$ data train is recorded on the track B0 at the region VH. The same operation is repeated for the first frame and frames following the first frame.

NORMAL REPRODUCING OPERATION

Then, the normal reproducing operation will be described. Data reproduced from the video tape 26 by the reproducing heads 28A and 28B are supplied to the amplifiers 30A and 30B respectively. The amplifiers 30A and 30B amplify the reproduced data and supply the amplified data to the data detection circuits 32A and 32B where the data of an image are detected respectively. Then, the rearrangement circuit 82 effects the reverse processing to the rearrangement circuit 80 of the recording side, so that an even number$^{th}$ data train is supplied to the error correction circuit 34A and the odd number$^{th}$ data train is supplied to the error correction circuit 34B.

Then, the error detection and correction by the error correction circuits 34A and 34B are effected, and then, decoding by the variable length code decoding circuits 36A and 36B are effected. Then, the combining circuit 84 effects the combining processing. In the case of the normal reproducing, because the data addition switch 84b is switched to the variable length decoding circuit 36B side, a reverse processing to the separation circuit 14 is effected by the mixing circuit 84A. The data train after the combining process is decoded by quadrature inverse conversion processing by the quadrature inverse conversion circuit 40'. This quadrature inverse conversion processing is reverse to the DCT is effected by the quadrature inverse conversion circuit 40. The output of the quadrature inverse conversion circuit 40' is supplied to the frame memory 12 through the switching circuit 97 controlled by the reproduced control signal from the control signal detection circuit 35. An output of the frame memory 12 is supplied to a D/A converter 42 for supplying an output reproduced analog video signal.

As mentioned, the video signal is reproduced through decoding of data.

OPERATION ON SEARCHING

Then, an operation on the searching will be described. FIG. 7D is an illustration of the second embodiment for showing an operation of the combining circuit. FIG. 7E is an illustration of the second embodiment for showing an output data of the combining circuit 84. It is assumed that the searching is effected to the video tape 26 where the signal recording is performed as mentioned above at a 2.5-times speed, for example. The region where the reproduction can be effected is shown in FIG. 8.

FIG. 8 is an illustration of the second embodiment for showing head loci and the region where the video signal is effectively reproduced when the 2.5-times speed searching and reproduction is carried out. As shown in FIG. 8, the head 28A starts tracing (reproducing) at a track A0 and then, traverses tracks B0 and A1 and ends the tracing at a track B1. Moreover, the head 28B starts tracing at a track B0, and then, traverses tracks A1 and B1, and ends the tracing at a track A2. These tracings provide reproduction of the video signal from portions SI–SL denoted by slant lines because of the head azimuth relation.

Similarly, the head 28A starts tracing at a track B2, and then traverses tracks A3 and B3, and ends tracing at a track A4. Moreover, the head 28B starts tracing at a track A3, and then traverses tracks B3 and A4, and ends the tracing at a track B4. These tracings provide reproduction of the video signal from portions SM–SP denoted by slant lines because of the head azimuth relation.

In this embodiment, on the searching, only even number$^{th}$ data trains (or only odd number$^{th}$ data trains) reproduced from the VL regions of respective tracks are used and a processing is effected such that data "0" is reproduced from the VH regions. Concretely, on the searching, the data addition switch 84B of the combining circuit 84 is switched to the "0" side on the basis of the search command. Thus, the even number$^{th}$ data trains as shown in FIG. 7B and data train of "0" are inputted to the mixing circuit 84A. These data are mixed as shown in FIG. 7D through alternately arranging.

As the result, the data train after mixing is such that odd number$^{th}$ data of the data train are replaced with data "0" as shown in FIG. 7E.

The quadrature inverse conversion circuit 40' effects the quadrature inverse conversion to such a data train. This provides, during the searching, a reproduced image having such a picture quality that contents of a program recorded can be confirmed because the even number$^{th}$ data train includes a dc component D (0) which is the lowest order data of DCT though the block distortion occurs. This is because the odd number$^{th}$ data are replace by "0".

Figure 9A:
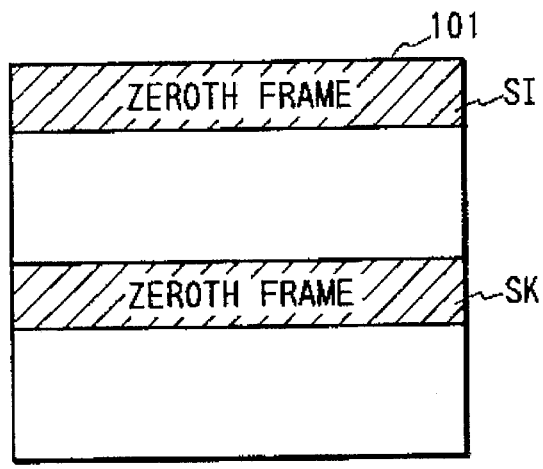
FIGS. 9A–9C are illustrations of the second embodiment for showing reproduced images.
Figure 9B:
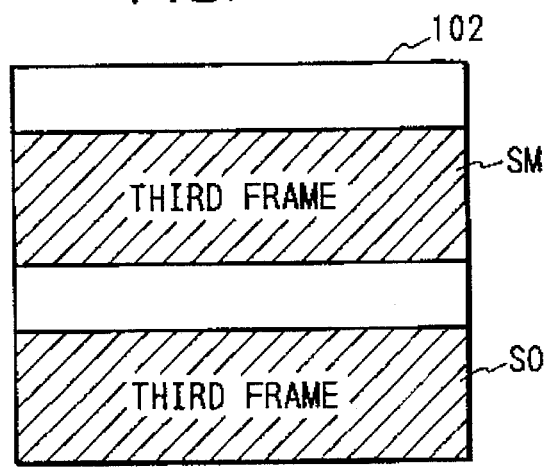
Figure 9C:
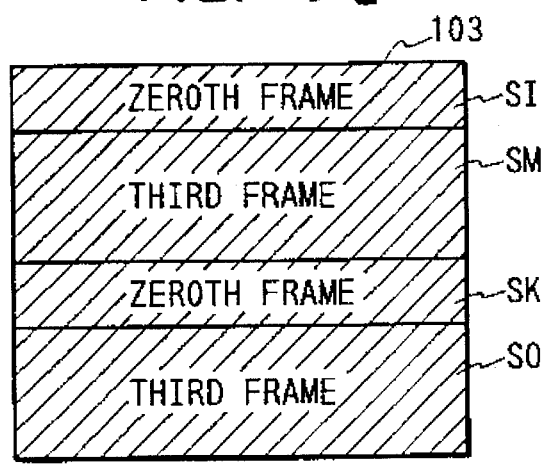

FIG. 9 is illustrations of the second embodiment for showing reproduced images. The reproduced image as mentioned can be seen on a display as shown in FIG. 9. In FIG. 9, the video data reproduced from the track A0 to B1 is shown only in portion SI and SK as shown by the image 101. The video data reproduced from the track A3 to B4 is shown only in portion SM and SO as shown by the image 102. The combined image is shown in by image 103 as one frame image.

Here, in the searching reproducing operation mentioned above, only even number$^{th}$ data trains are used and the odd number$^{th}$ data are replaced by "0". That is, the DCT coefficient data used for the inverse conversion are a half of 8×8=64, namely, thirty-two. However, as described in the first embodiment, if the DCT is effected per field, the even number$^{th}$ data trains are the first field data trains and the odd number$^{th}$ data trains are the second field data trains. Therefore, the even number$^{th}$ data trains used for the searching reproduction are only first field data trains. Therefore, the number of the DCT coefficients used for the inverse conversion are thirty-two.

However, if data of the first and second fields are mixed on the searching by the separation circuit 14, the first field data and the second field data are mixed in the even number$^{th}$ data train used for the searching reproduction. As result of this, the searching reproduction image becomes poor because the number of the DCT coefficient used for the inverse conversion is fewer than thirty-two. According to this embodiment, such a defective is prevented and confirmation of the contents on the searching can be favorably done. Further, according to this embodiment, the number of frames of images included in the searching reproduction is reduced compared with the prior art by using only even number$_{th}$ data trains, so that the confirmation of contents of images can be easy.

A modification of the second embodiment will be described.

Figure 3B:
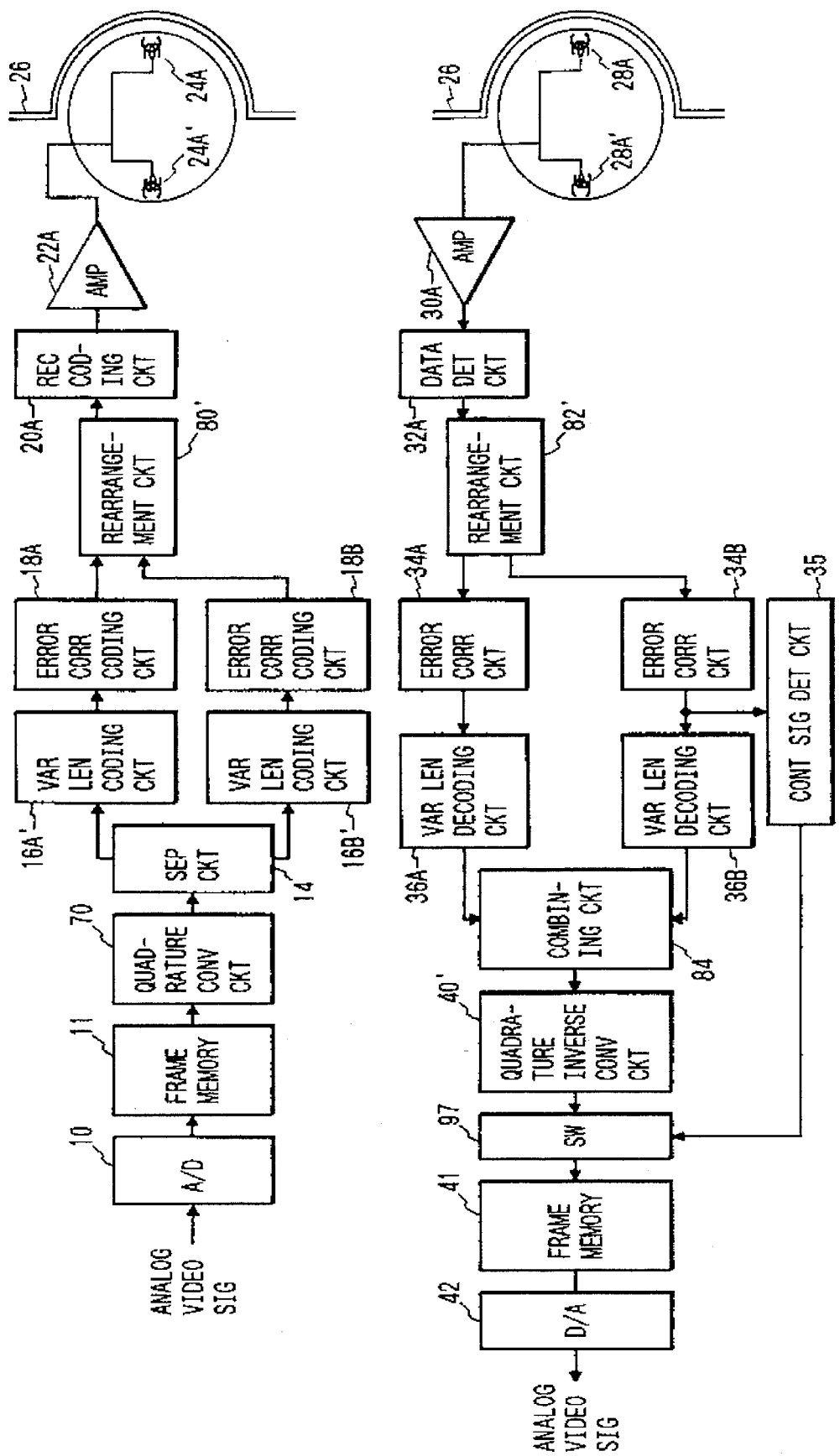
FIG. 3B is a block diagram of a modification of the second embodiment.

FIG. 3B is a block diagram of the modification of the second embodiment. The basic structure of the modification of the second embodiment is substantially the same as the second embodiment shown in FIG. 3A. The difference in the recording side is in that the record coding circuit 20B, the recording amplifier 22B are not used and the rearrangement circuit 80 is replaced by a rearrangement circuit 80'. The heads 24A and 24A' are provided on the rotary cylinder at the opposite position as shown. Similarly, in the reproducing side, the amplifier 30B, and the data detection circuit 32B are not used and the rearrangement circuit 82 is replaced by a rearrangement circuit 82'. The heads 28A and 28A' are provided on the rotary cylinder at the opposite position as shown.

Figure 5:
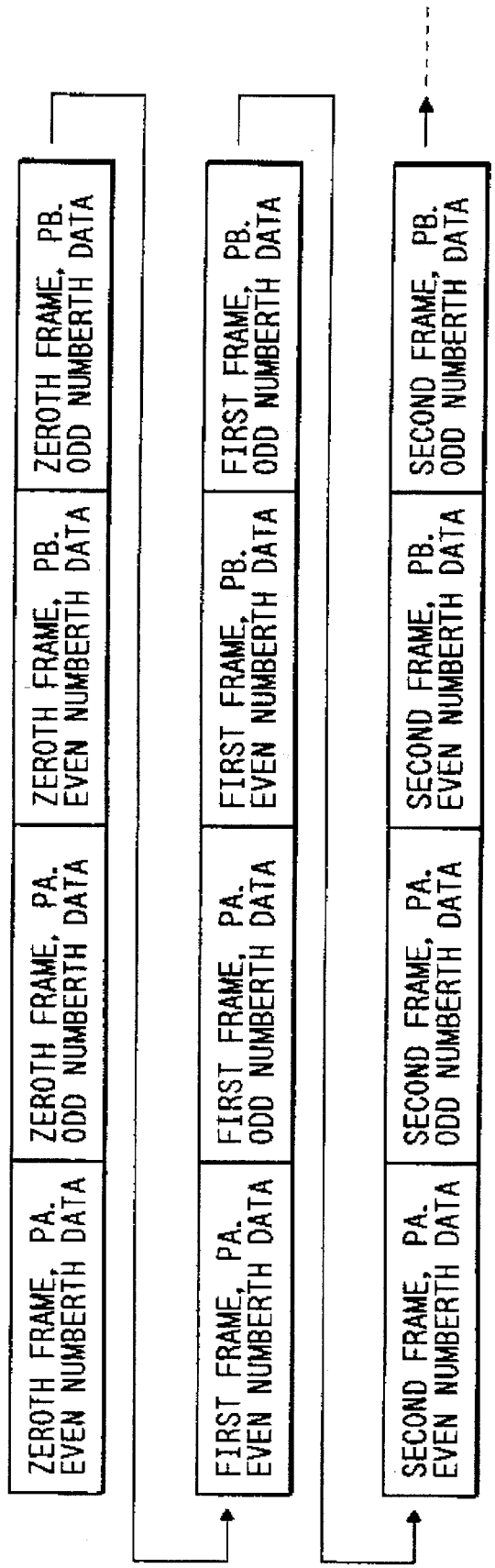
FIG. 5 is an illustration of the modification of the second embodiment for showing data trains outputted by a rearrangement circuit shown in FIG. 3B.

FIG. 5 is an illustration of the modification of the second embodiment for showing data trains outputted by a rearrangement circuit 80' shown in FIG. 3B.

Because the heads 24A and 24A' are provided at the opposite position of the rotary cylinder, the heads 24A and 24A' record the data from the amplifier 22A alternately. The data to be recorded is serially outputted from the amplifier 22A because there is only one signal path from the rearrangement circuit 80' to the amplifier 22A. Therefore, in order to form the tape format as show in FIG. 4B from the video signal representing the picture image shown in FIG. 4A, the rearrangement circuit 80' rearranges the data from the error correction coding circuits 18A and 18B as shown in FIG. 5. The rearrangement circuit 82' rearranges the reproduced data from the heads 28A and 28A', the amplifier 30A, and the data detection circuit 32A arranged as show in FIG. 5. That is, the rearrangement circuit 82' separates the data trains shown in FIG. 5 into the even number$^{th}$ data and odd number$^{th}$ data. The even number$^{th}$ data is sent to the error correction circuit 34A and the odd number$^{th}$ data are sent to the error correction circuit 34B. Other operation is substantially the same as the second embodiment.

Moreover, this invention is not limited to the above-mentioned embodiments and, for example, the following embodiments are included:

(1) In the above-mentioned embodiment, the two-dimensional DCT processing 8×8 pixels or 8×4 pixels is used as a unit for quadrature conversion. However, the number of the pixels for DCT conversion can be set appropriately. Further, a multi-dimensional DCT can be also used. Moreover, the other quadrature conversion method can be used. Such modifications are also true in the variable length coding, the error correction coding or the like. Moreover, it is possible to effect the method of the zigzag scanning in consideration of the method of the separation. Thus, it is not limited to the order described in the above-mentioned embodiment.

(2) In the above-mentioned embodiment, the separation was done to have two data trains having the same number of data. However, the number of data trains can be increased as necessary.

(3) For example, if the output side of the quadrature conversion circuit 70 shown in FIG. 3A is directly connected to the input side of the variable length coding circuit 16A, it has the same structure as the general digital video signal recording apparatus. If such a connection and the connection shown in FIG. 3A is switched by a switch and a plurality of operation modes, such as the standard mode and the high picture quality mode, are provided, it is possible to change an amount of data in recording and reproducing in one VTR. The number of searching operation modes can be set appropriately as necessary. For example, there are cases, such as, only twice-speed mode, twice-speed and 2.5-times-speed mode.

(4) In the above-mentioned embodiment, the variable length coding is effected after addition of data "0" in the separation circuit 14. However, if a coding processing can be effected as similar as the case of the data addition of "0" on the variable length coding circuit side, the data addition on the separating is not necessary.

(5) The above-mentioned embodiment is shown as this invention is applied to the VTR. However, this invention is applicable to other general video processing apparatus such as the video disc.

(6) In the above-mentioned embodiments, the picture plane is divided into two. However, it can be appropriately divided as necessary. Moreover, in connection with divided regions, it is possible to separate not only into upper and lower sides but into appropriate regions.

As mentioned above, according to the coding circuit and decoding circuit for the digital video signal according to this invention, because data is separated at each field when data after the quadrature conversion is separated into at least two data trains, the switching of adaptive quadrature conversion can be effected suitably and the improvement of the picture quality of the reproduced image on the searching is provided.

What is claimed is:

1. A digital video signal coding circuit for coding digital video data comprising:

(a) first orthogonal transforming means for effecting orthogonal transformation to said digital video data at every first unit area of a frame of said digital video data to produce a first set of coefficient data, said frame including first and second fields;

(b) first scanning means for scanning said first set of coefficient data in a first predetermined order to produce a first data train including a first set of odd numbered data indicative of said digital video data at every first unit area and a first set of even numbered data indicative of said digital video data at every first unit area;

(c) second orthogonal transforming means for effecting orthogonal transformation to said digital video data at every second unit area of said first field and at every third unit area of said second field to produce second and third sets of coefficient data respectively, said first unit area corresponding to said second and third unit areas;

(d) second scanning means for scanning said second and third coefficient data in a second predetermined order to produce a second data train including a second set of odd numbered data indicative of said digital video data at every second unit area and a second set of even numbered data indicative of said digital video data at every third unit area;

(e) detection means for detecting which one of said first and second frame data trains has a smaller amount of high frequency components to produce a control signal;

(f) selecting means responsive to said control signal, for outputting as a third data train either of said first or second data train;

(g) separating means for separating said third data train and outputting said first set of even numbered data as a fourth data train and said first set of odd numbered data as a fifth data train when said selecting means outputs said first data train, and outputting said second set of even numbered data as said fourth data train and said second set of odd numbered data as said fifth data train when said selecting means outputs said second data train;

(h) first coding means for effecting a data compression coding to said fourth data train;

(i) signal adding means for adding said control signal to said fourth data train from said first coding means to output a first coded video data; and (j) second coding means for effecting said data compression coding to said fifth data train to output a second coded video data.

2. A digital video signal coding and decoding circuit for decoding first and second input signals, which are produced by the digital video signal coding circuit for coding digital video data, the digital video signal coding circuit comprising:

first orthogonal transforming means for effecting orthogonal transformation to said digital video data at every first unit area of a frame of said digital video data to produce a first set of coefficient data, said frame including first and second fields;

first scanning means for scanning said first set of coefficient data in a first predetermined order to produce a first data train including a first set of odd numbered data indicative of said digital video data at every first unit area and a first set of even numbered data indicative of said digital video data at every first unit area;

second orthogonal transforming means for effecting orthogonal transformation to said digital video data at every second unit area of said first field and at every third unit area of said second field to produce second and third sets of coefficient data respectively, said first unit area corresponding to said second and third unit areas;

second scanning means for scanning said second and third coefficient data in a second predetermined order to produce a second data train including a second set of odd numbered data indicative of said digital video data at every second unit area and a second set of even numbered data indicative of said digital video data at every third unit area;

detection means for detecting which one of said first and second frame data trains has a smaller amount of high frequency components to produce a control signal;

selecting means for responsive to said control signal, outputting as a third data train either of said first or second data train;

separating means for separating said third data train and outputting said first set of even numbered data as a fourth data train and said first set of odd numbered data as a fifth data train when said selecting means outputs said first data train, and outputting said second set of even numbered data as said fourth data train and said second set of odd numbered data as said fifth data train when said selecting means outputs said second data train;

first coding means for effecting a data compression coding to said fourth data train;

signal adding means for adding said control signal to said fourth data train from said first coding means to output a first coded video data; and second coding means for effecting said data compression coding to said fifth data train to output a second coded video data as said second input signal, the digital video signal decoding circuit comprising:

(a) first decoding means for effecting a decoding to said first input signal to reproduce said fourth data train;

(b) second decoding means for effecting said decoding to said second input signal to reproduce said fifth data train;

(c) mixing means for mixing said reproduced fourth and fifth data trains to reproduce said third data train;

(d) first inverse orthogonal transforming means, having a fourth unit area corresponding to said first unit area, for effecting inverse orthogonal transformation;

(e) first inverse scanning means for arranging said reproduced third data train from said mixing means on said fourth unit area to reproduce said first set of coefficient data, said first inverse orthogonal transforming means reproducing said digital video data;

(f) second inverse orthogonal transforming means having third and fourth field unit areas for effecting inverse orthogonal transformation;

(g) second inverse scanning means for arranging said reproduced third data train on said third and fourth field unit areas to reproduce said second and third sets of coefficient data on said third and fourth area respectively, said second inverse orthogonal transforming means reproducing said digital video data from said second and third set of coefficient data;

(h) control signal detection means for detecting said control signal from said first coded video data; and (i) switching means responsive to said reproduced control signal for controlling of outputting of said reproduced video data from said first inverse orthogonal transforming means or said second inverse orthogonal transforming means.

* * * * *